Figure 3:
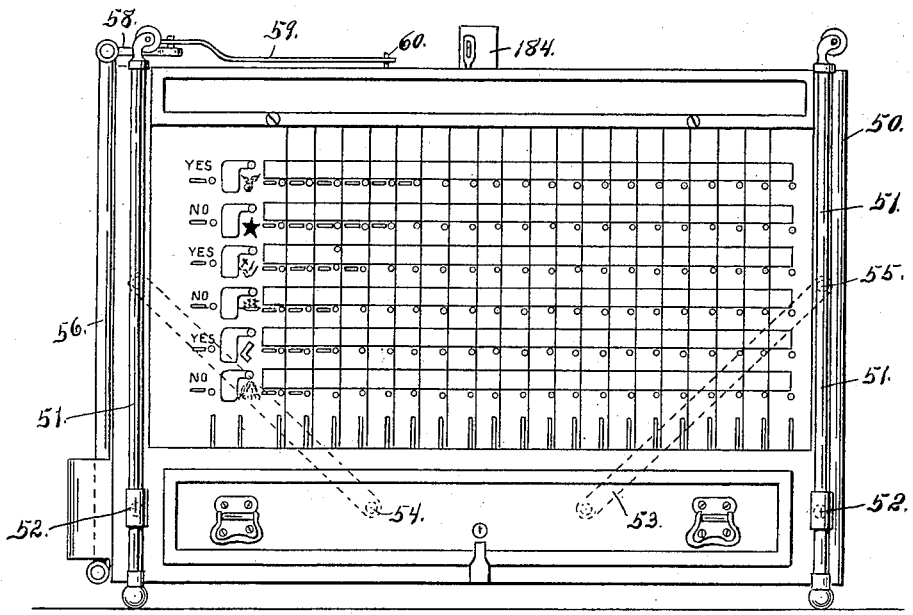

A. McKENZIE.
VOTING MACHINE.
APPLICATION FILED OCT. 2, 1899.
1,069,343.
Patented Aug. 5, 1913.
17 SHEETS—SHEET 1.
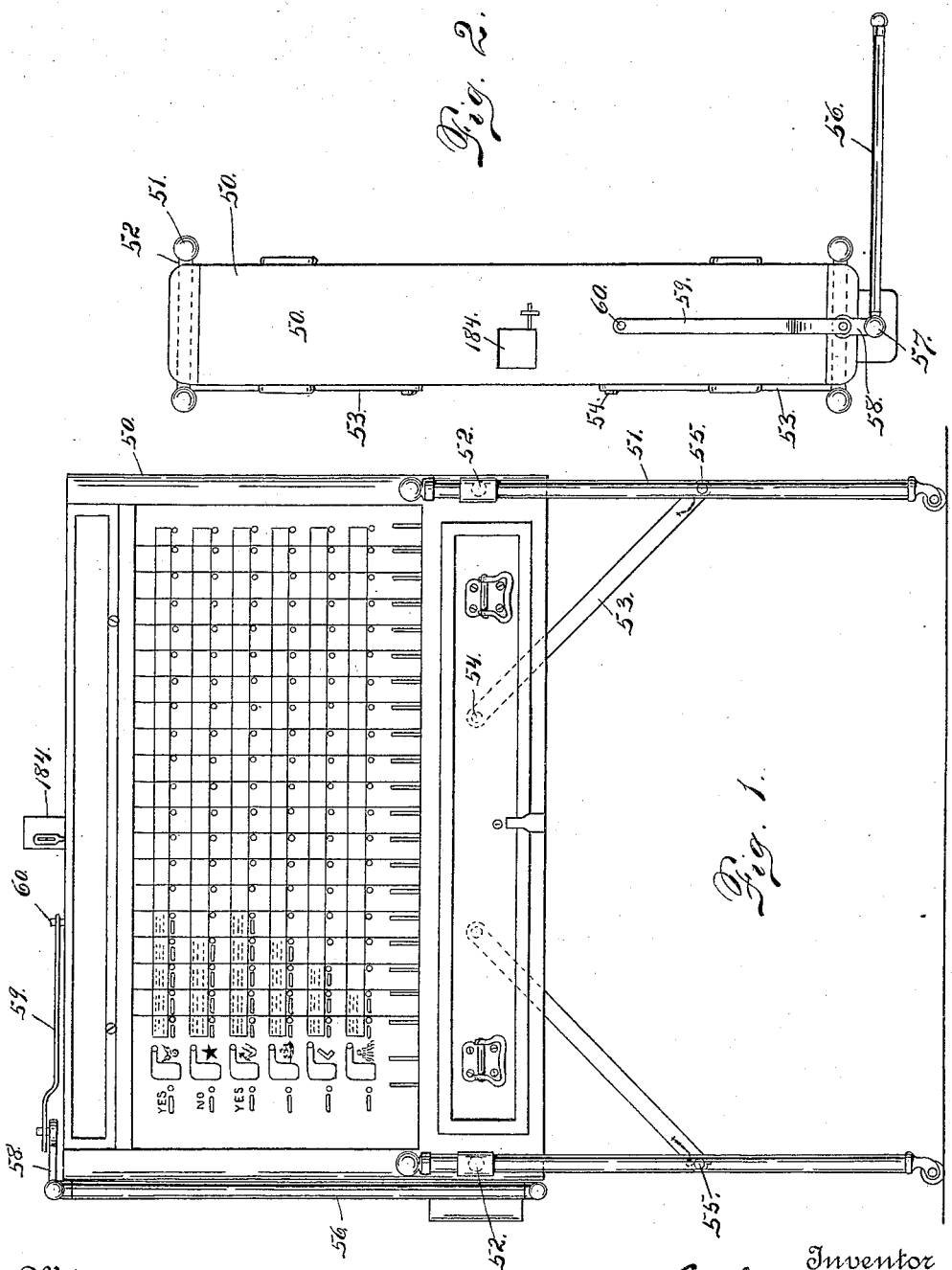

A. McKENZIE.
VOTING MACHINE.
APPLICATION FILED OCT. 2, 1899.

1,069,343.

Patented Aug. 5, 1913.
17 SHEETS—SHEET 2.

Witnesses
Gustave R. Thompson
John N. Holt

Inventor
A. McKenzie
by Wilkinson & Fisher
Attorneys

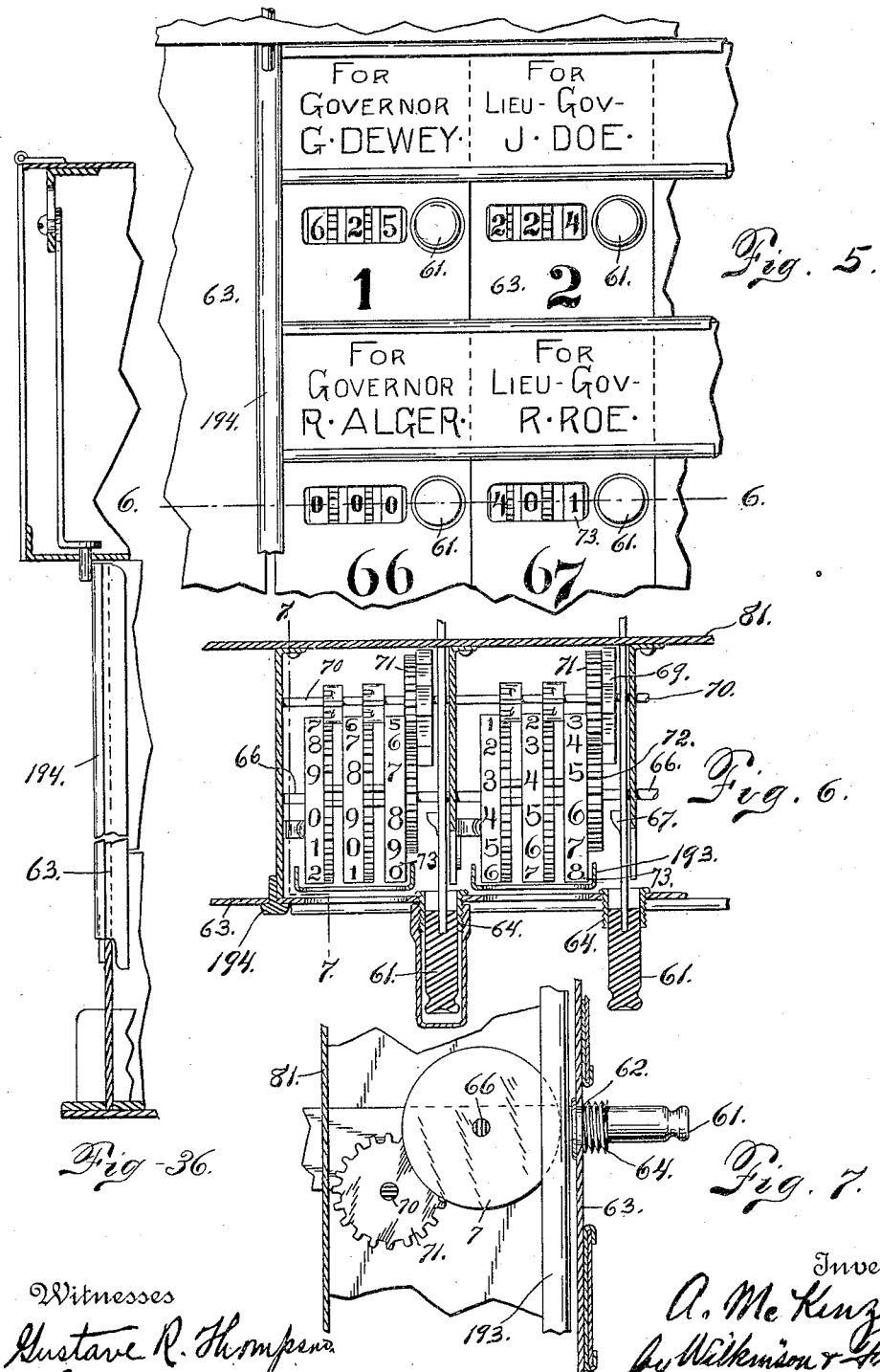

A. McKENZIE.
VOTING MACHINE.
APPLICATION FILED OCT. 2, 1899.

1,069,343.

Patented Aug. 5, 1913.
17 SHEETS—SHEET 4.

Witnesses
Gustave R. Thompson
John H. Holt

Inventor
A. McKenzie
By Wilkinson & Fisher
Attorneys

A. McKENZIE.
VOTING MACHINE.
APPLICATION FILED OCT. 2, 1899.

1,069,343.

Patented Aug. 5, 1913.
17 SHEETS—SHEET 5.

A. McKENZIE.
VOTING MACHINE.
APPLICATION FILED OCT. 2, 1899.

1,069,343.

Patented Aug. 5, 1913.
17 SHEETS—SHEET 6.

Witnesses:
Gustave R. Thompson
John N. Walsh

Inventor:
A. McKenzie
by Wilkinson & Fisher
Attorneys.

A. McKENZIE.
VOTING MACHINE.
APPLICATION FILED OCT. 2, 1899.

1,069,343.

Patented Aug. 5, 1913.

17 SHEETS—SHEET 7.

Witnesses
Gustave R Thompson

Inventor
A. McKenzie.
by Wilkinson & Fisher
Attorneys.

COLUMBIA PLANOGRAPH CO., WASHINGTON, D. C.

A. McKENZIE.
VOTING MACHINE.
APPLICATION FILED OCT. 2, 1899.

1,069,343.

Patented Aug. 5, 1913.
17 SHEETS—SHEET 8.

Witnesses
Gustave R. Thompson
John H. Holt

Inventor
A. McKenzie
by Wilkinson & Fisher
Attorneys

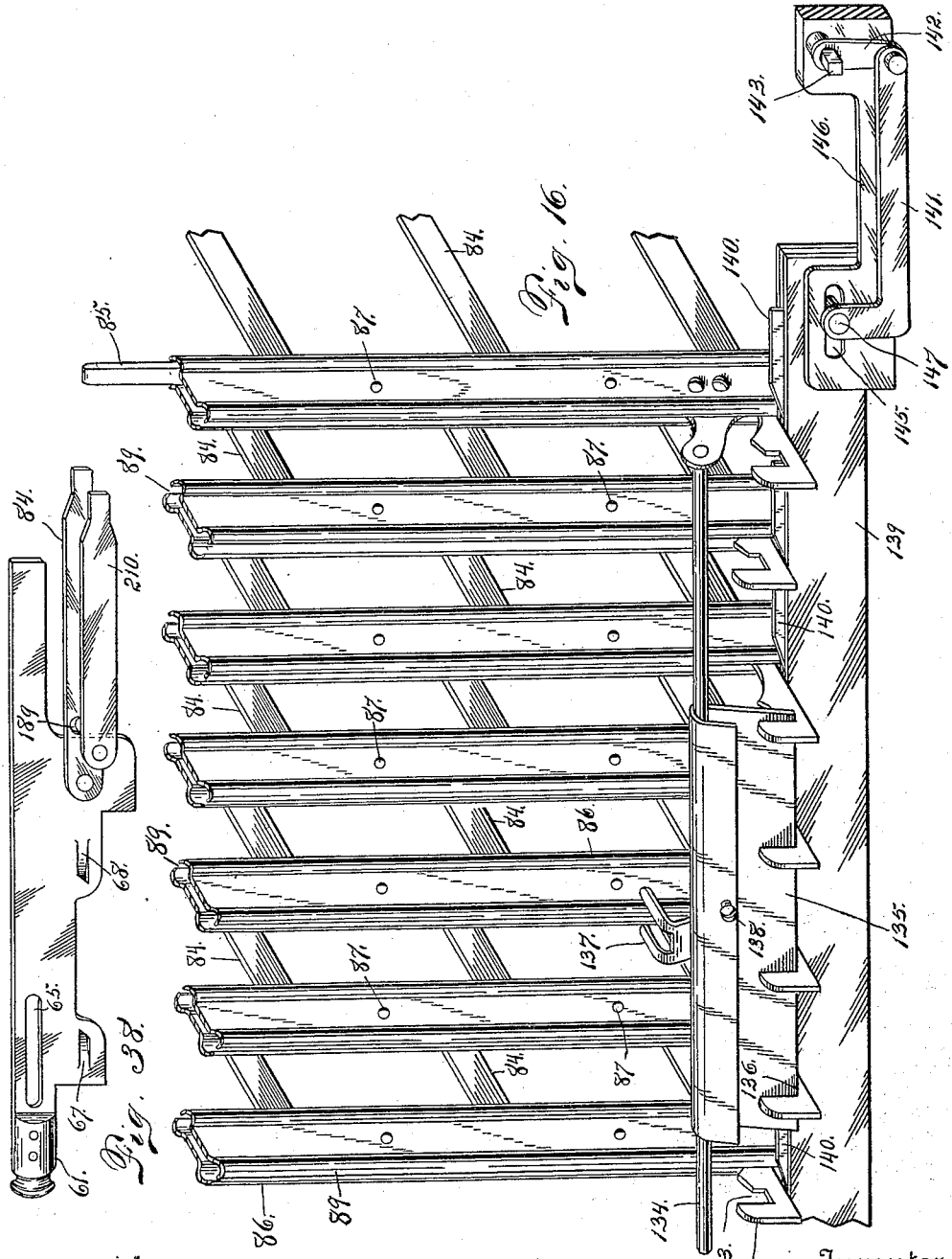

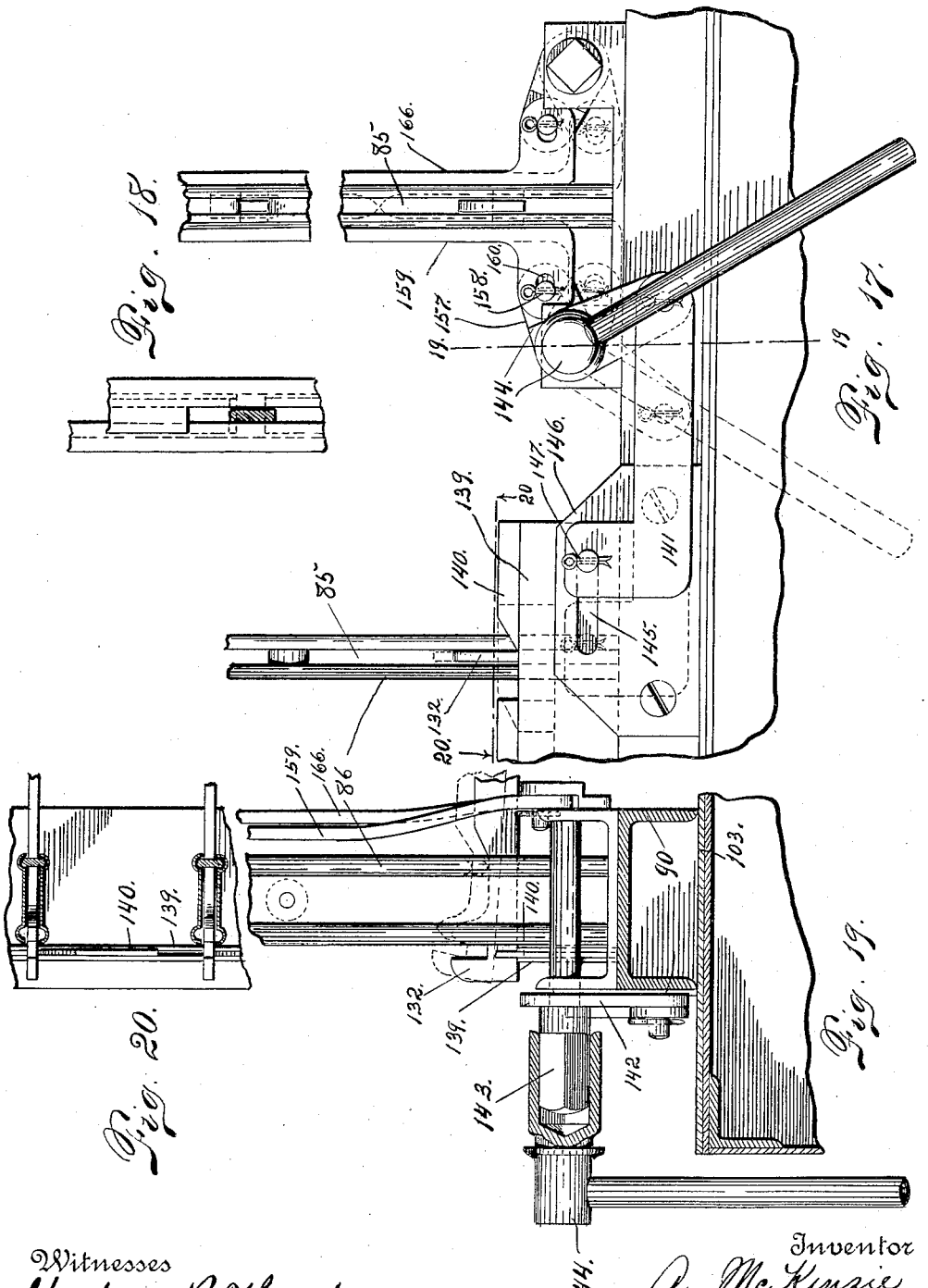

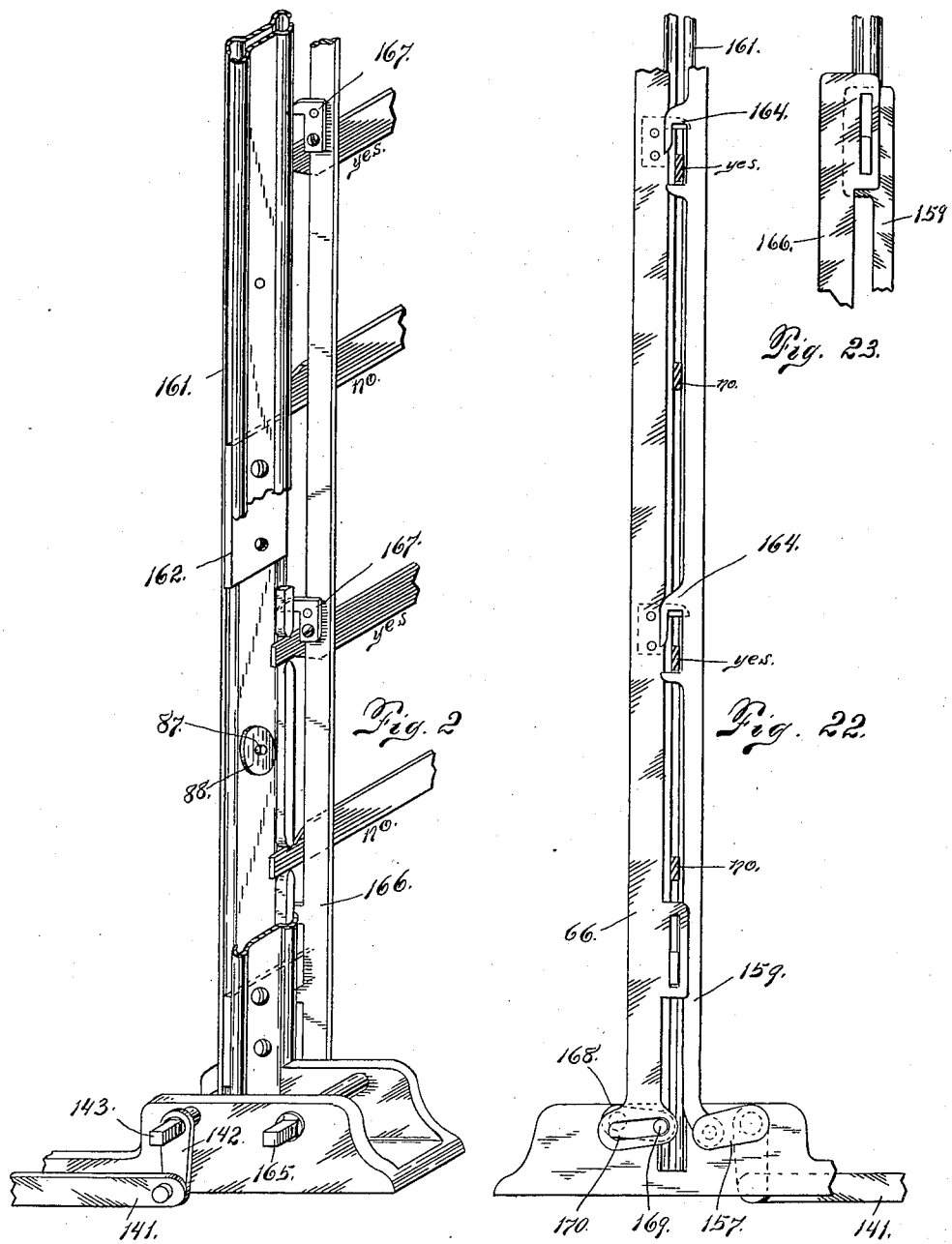

A. McKENZIE.
VOTING MACHINE.
APPLICATION FILED OCT. 2, 1899.
1,069,343.
Patented Aug. 5, 1913.
17 SHEETS—SHEET 12.
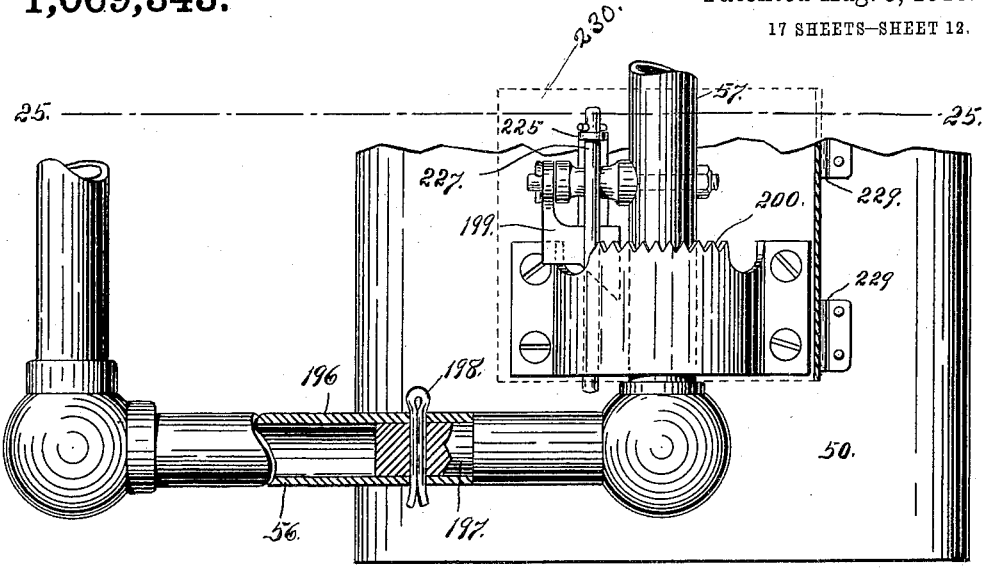
Fig. 24.
Fig. 24-A.
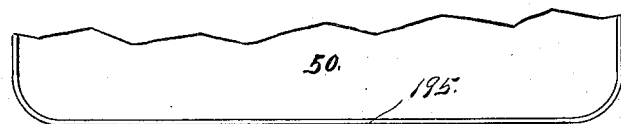
Fig. 25.
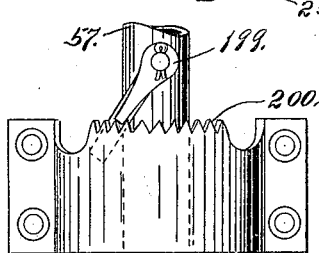
Fig. 26.
Witnesses:
Gustave R. Thompson.
John N. Kolk.
Inventor.
A. McKenzie.
by Wilkinson & Fisher
Attorneys.

A. McKENZIE.
VOTING MACHINE.
APPLICATION FILED OCT. 2, 1899.
1,069,343.
Patented Aug. 5, 1913.
17 SHEETS—SHEET 13.
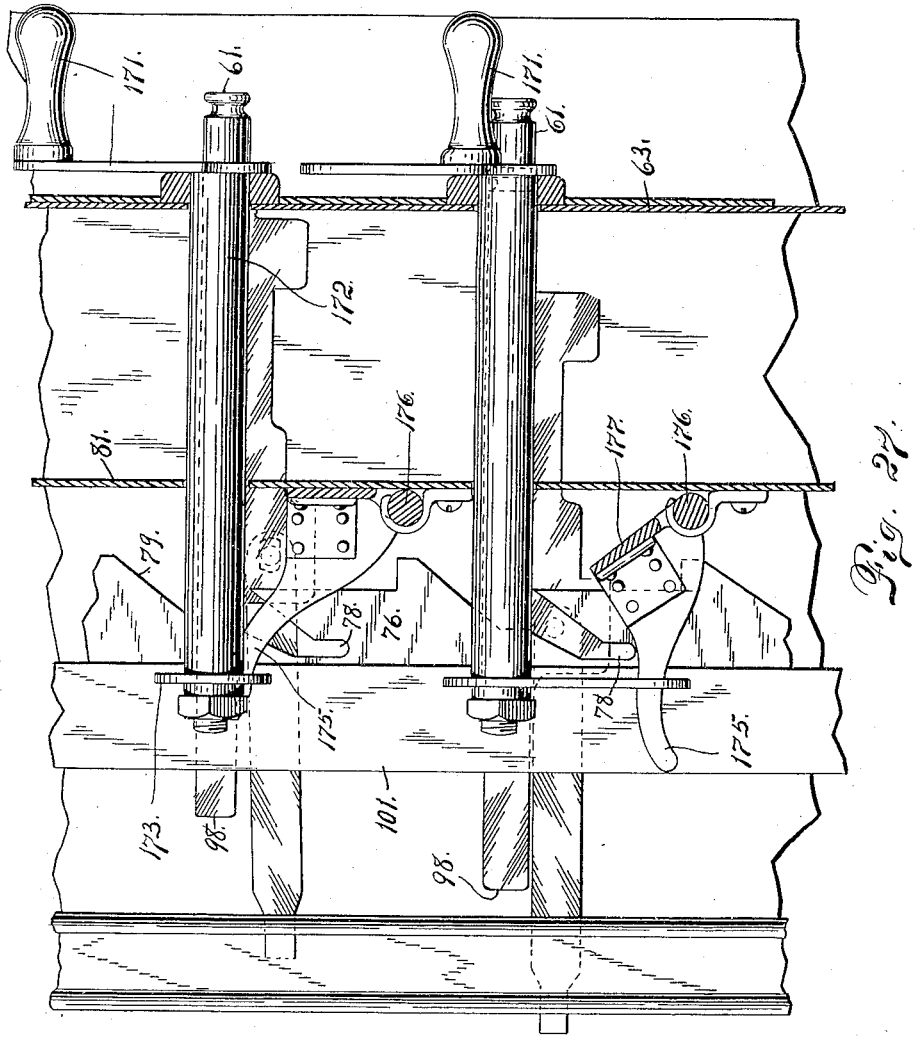
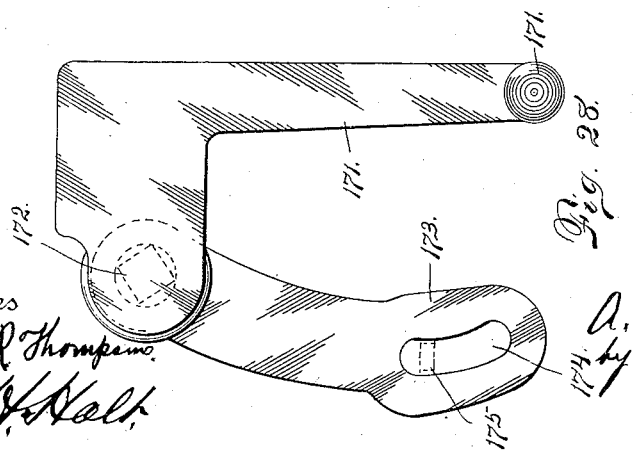

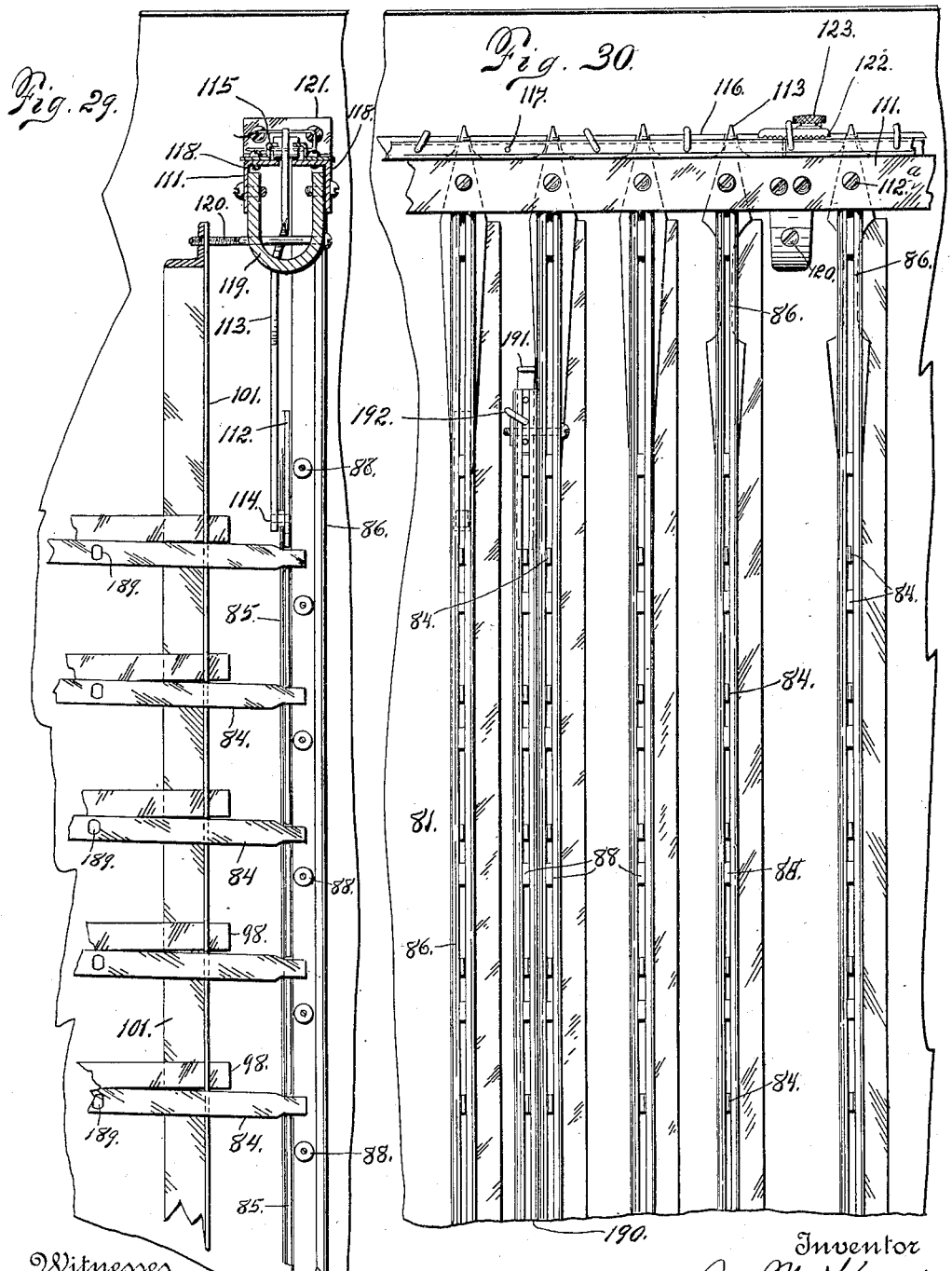

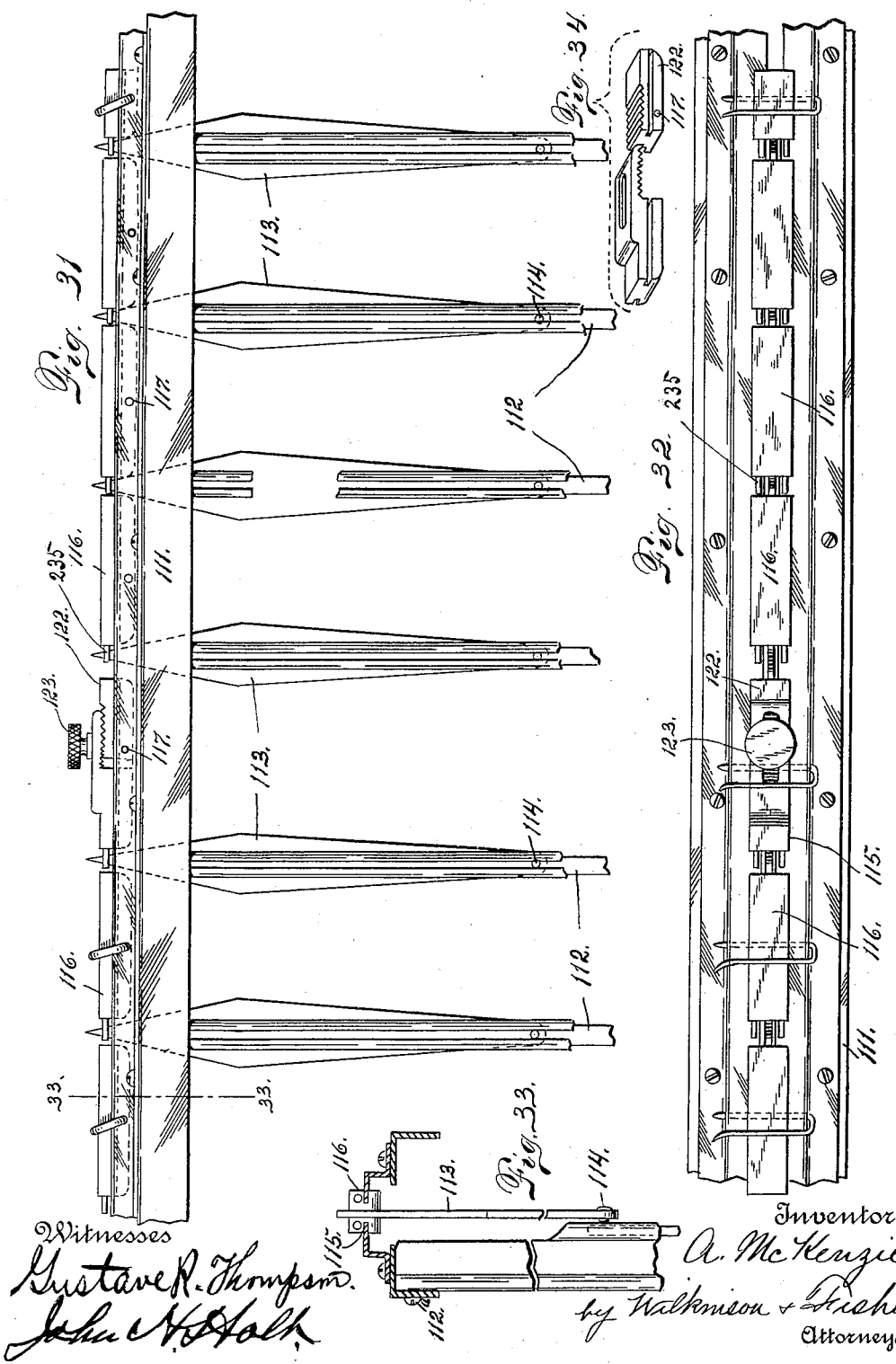

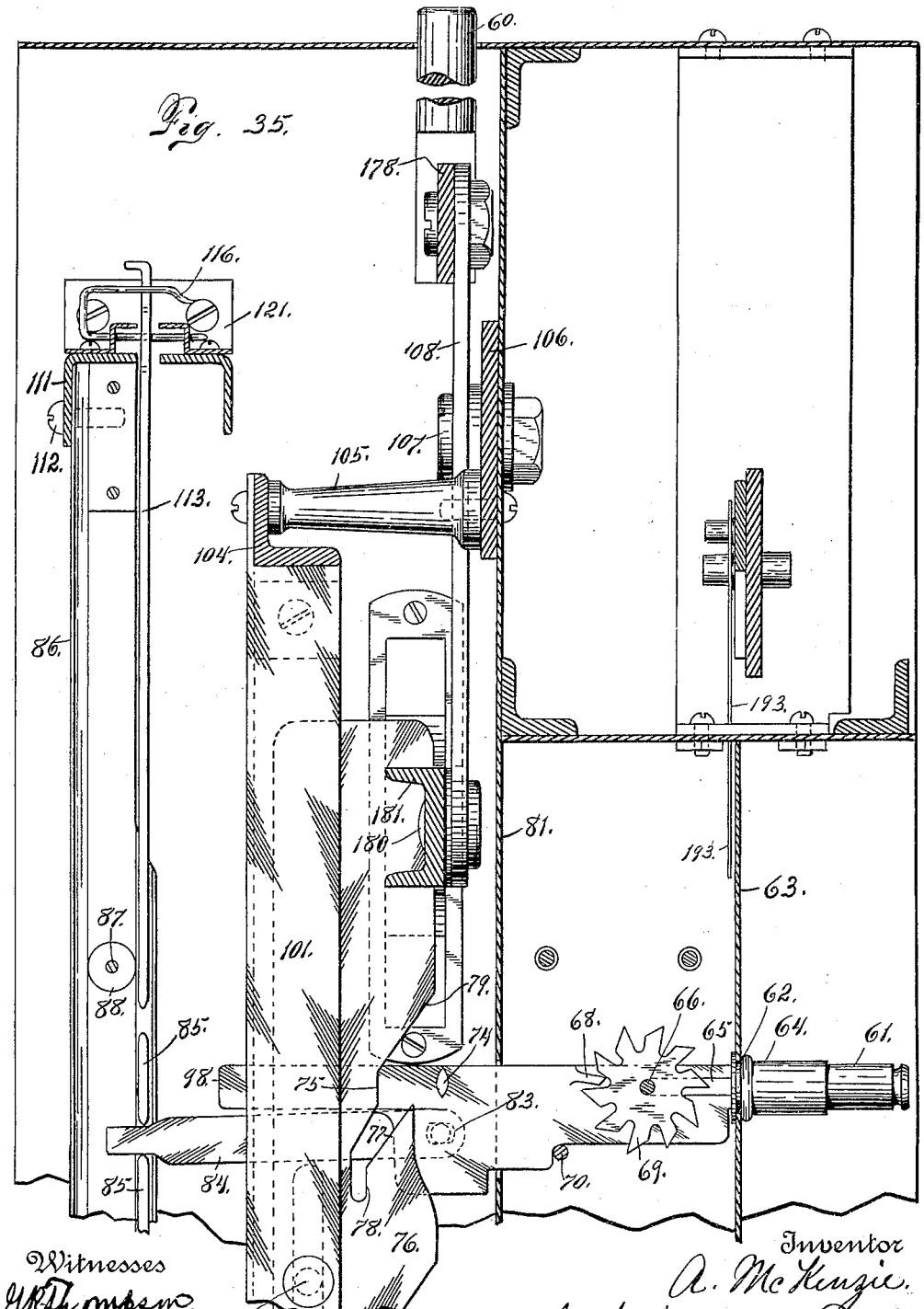

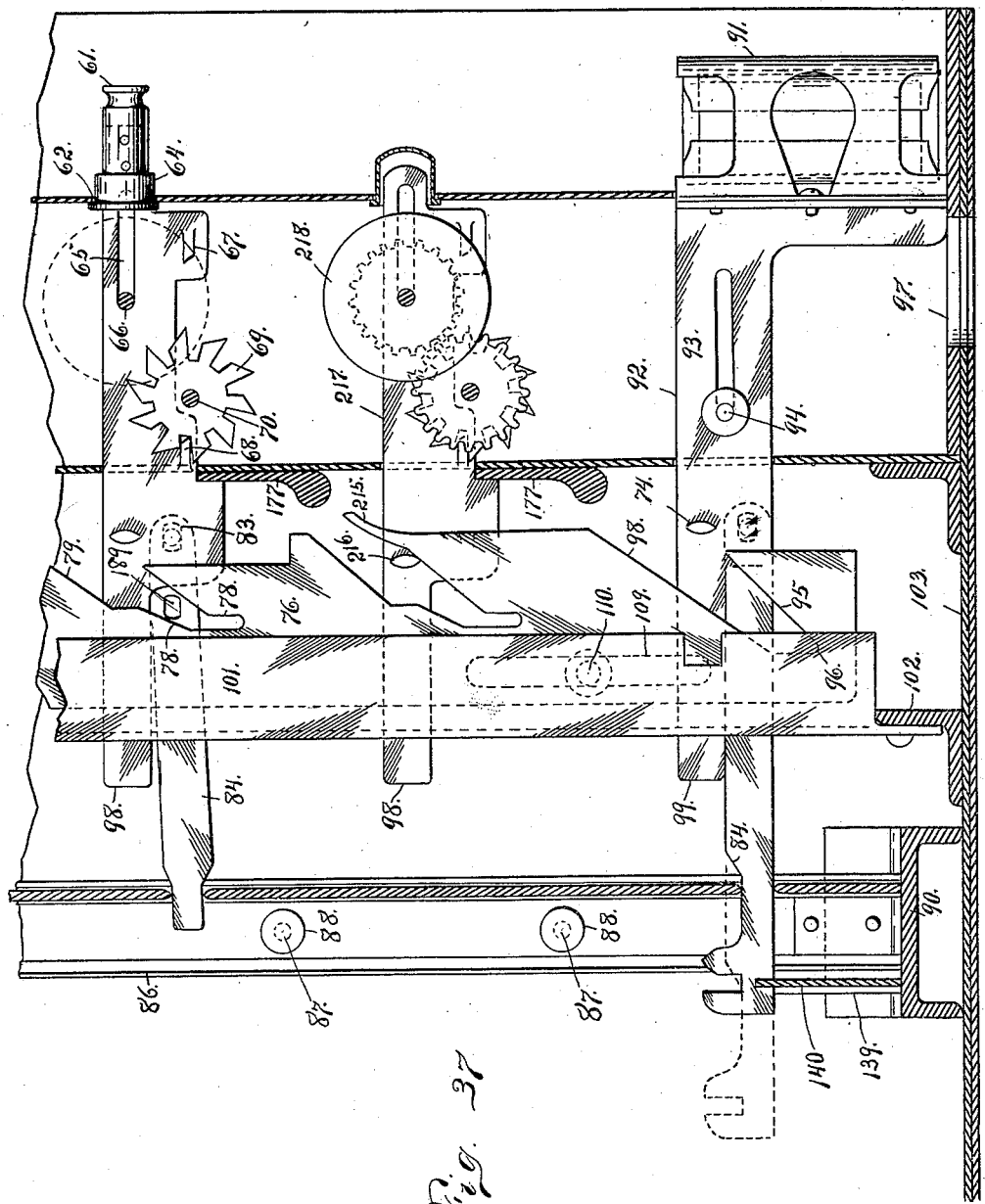

UNITED STATES PATENT OFFICE.

ANGUS McKENZIE, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

1,069,343.  Specification of Letters Patent.  Patented Aug. 5, 1913.

Application filed October 2, 1899. Serial No. 732,393.

*To all whom it may concern:*

Be it known that I, ANGUS MCKENZIE, of Canada, residing at Jamestown, in the county of Chautauqua and State of New York, have invented certain new and useful Improvements in Voting-Machines; and I do hereby declare the following to be a full, clear, and exact description of the invention, such as will enable others skilled in the art to which it appertains to make and use the same.

The object of my invention is to provide an improved voting machine whereby a voter can register his vote by mechanical means, in which a voter can cast a straight ticket by pulling a single straight ticket lever which moves all of the keys of that party to their voted position without moving the counters, after which the voter can pull back any of the keys which he does not desire to vote and vote others in their stead.

My invention also contemplates the improvement of the interlocking system, as is shown in accompanying drawings in which the interlocking blocks are carried in channels or placed just back of the keys and run parallel with the office groups, an interlocking channel being used in connection with each single office group of keys.

My invention also includes improved means whereby these parallel channels of adjoining sections may be thrown together into multi-candidate groups.

It also provides improved means for a woman's lock out and locking out of the yes and no and an improved form of counter-actuator and free ballot depositing device, together with a receptacle for the free ballots and improved means to prevent fraud in connection with the free ballot device of multi-candidate groups; also an improved means to provide for the indorsed candidates in multi-candidate groups, and other inventions shown and described in the accompanying drawings and specifications.

Figure 4:
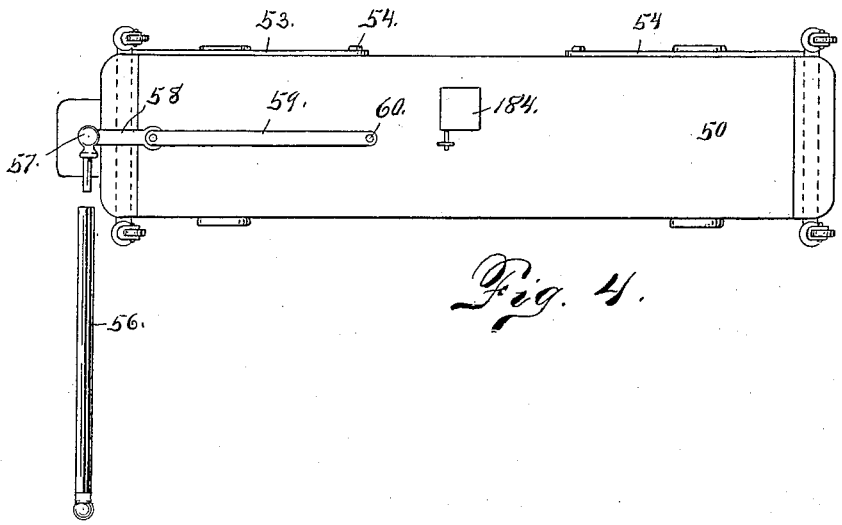
Figure 8:
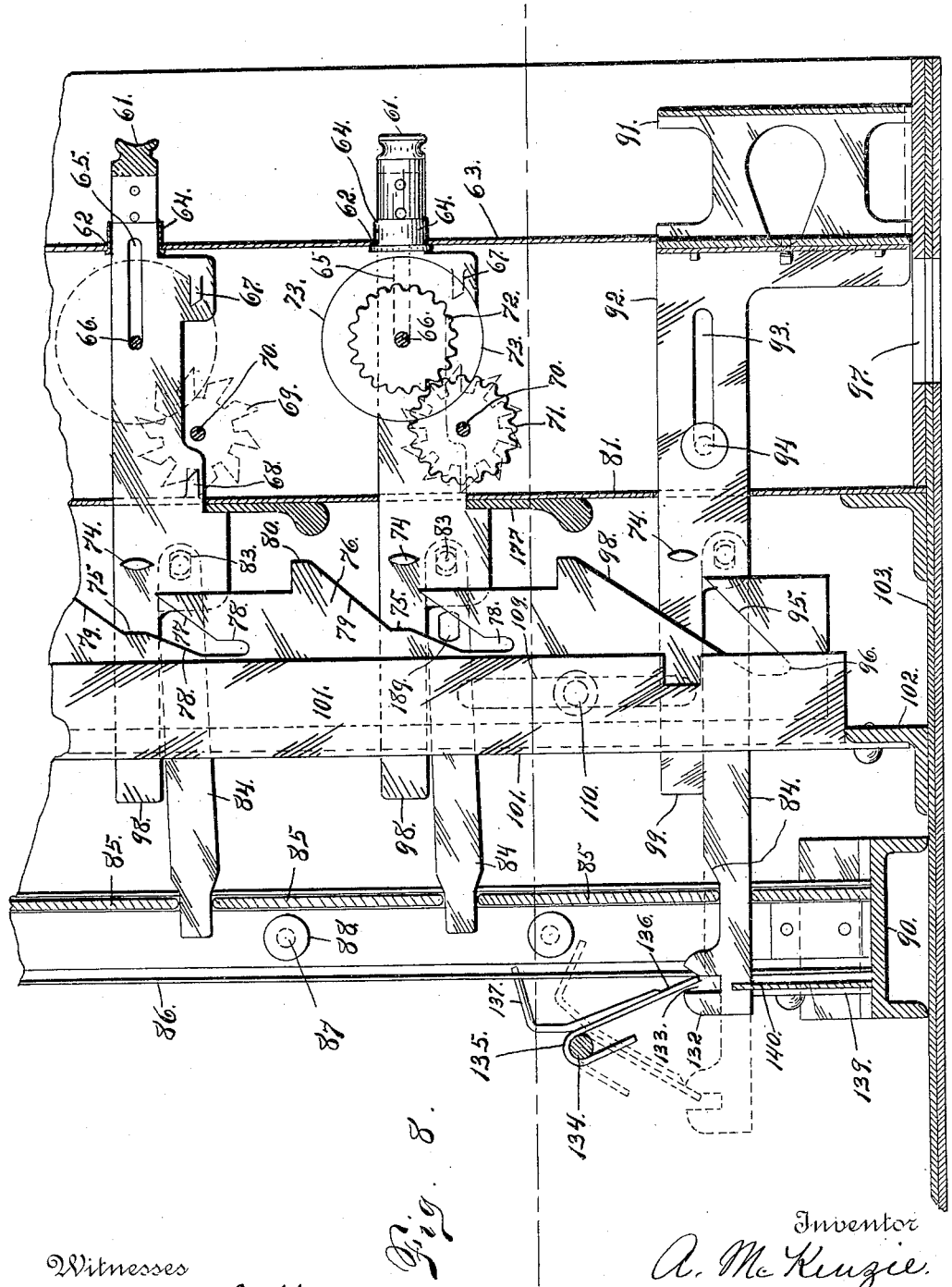
Figure 9:
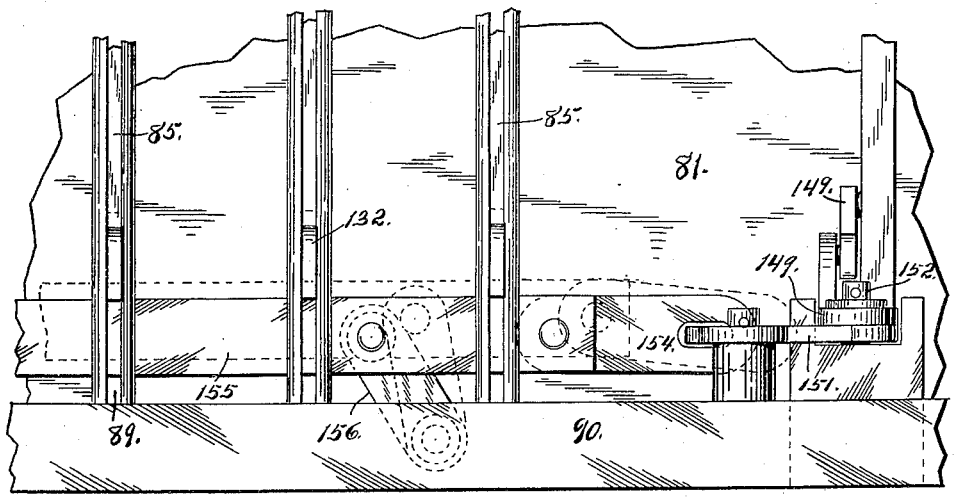
Figure 10:
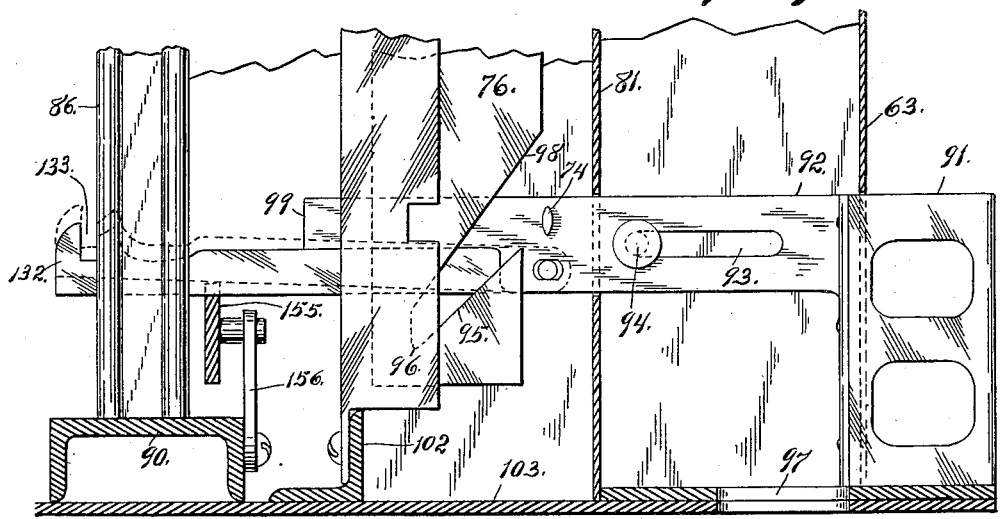
Figure 11:
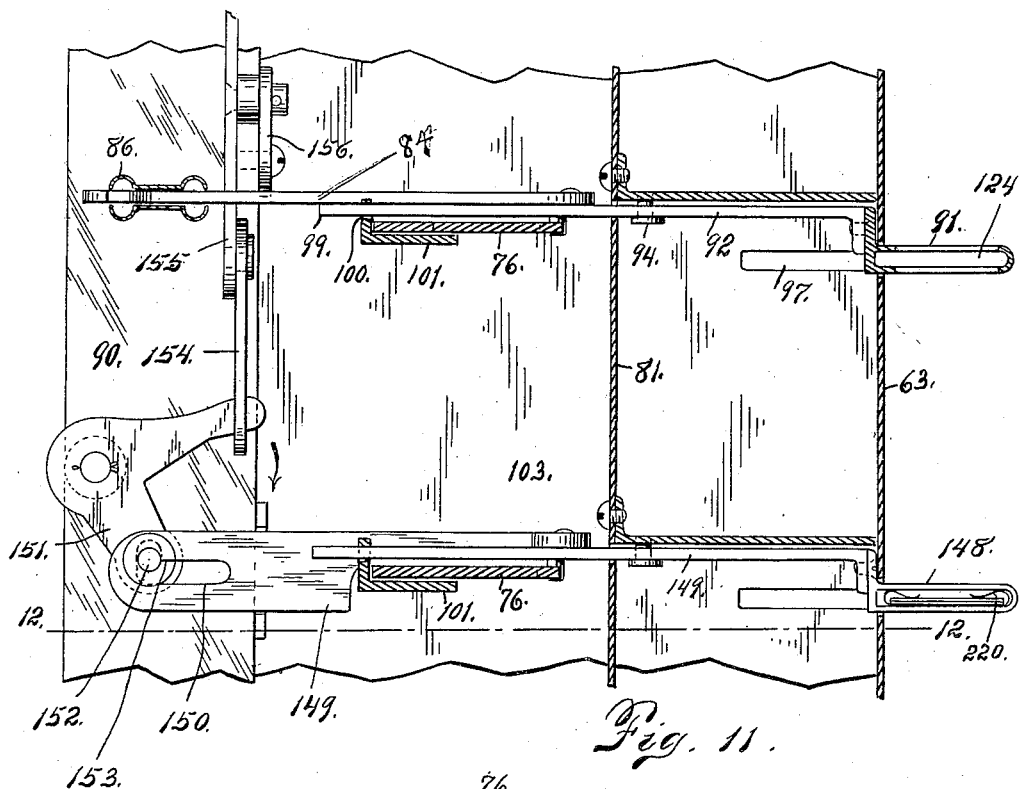
Figure 12:
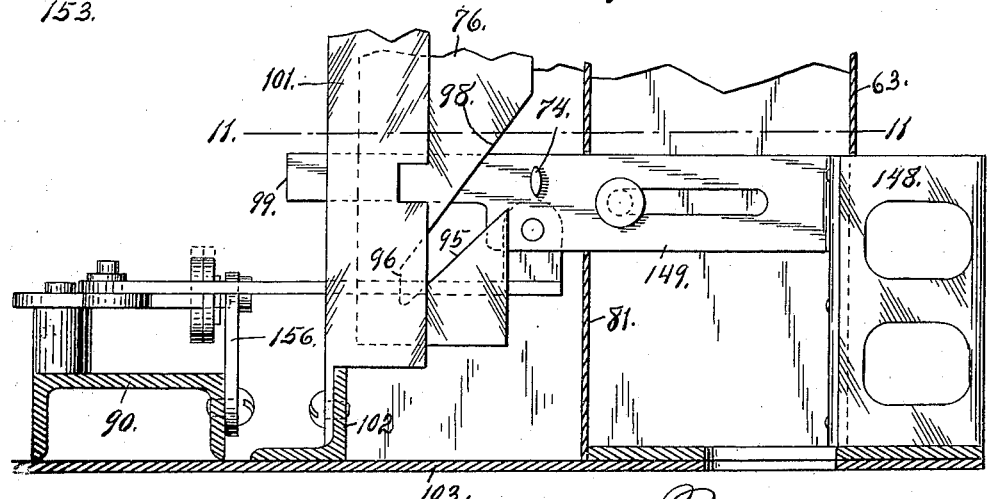
Figure 39:
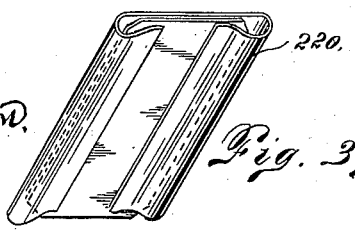
Figure 13:
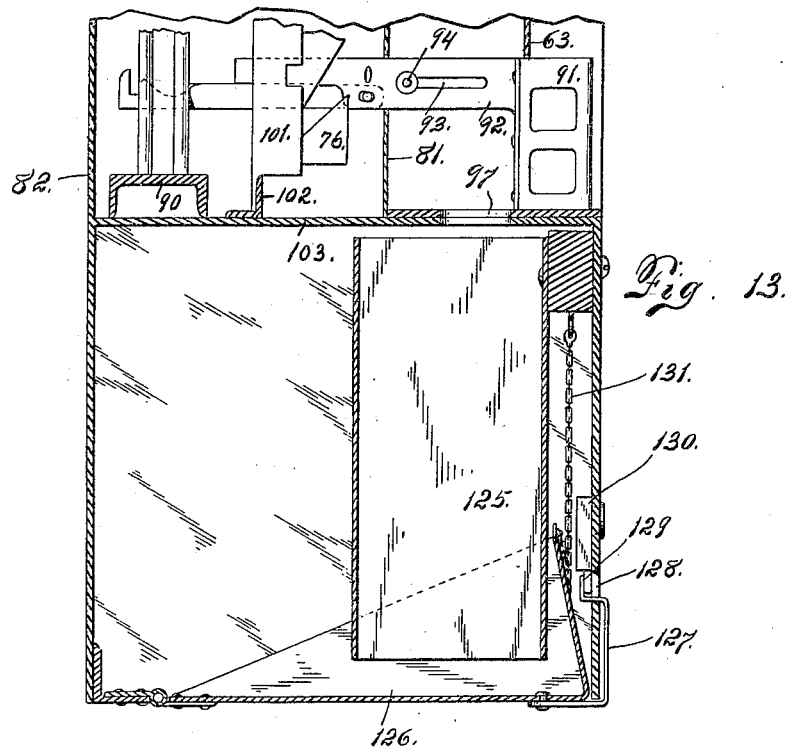
Figure 14:
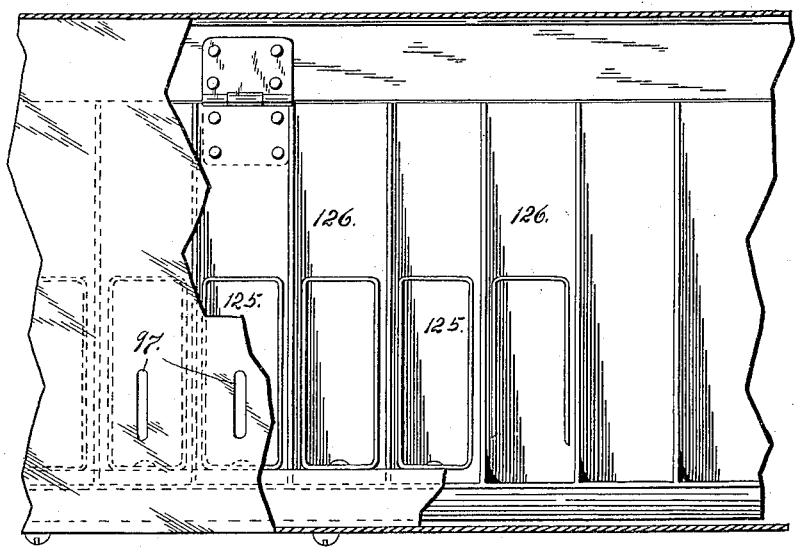
Figure 15:
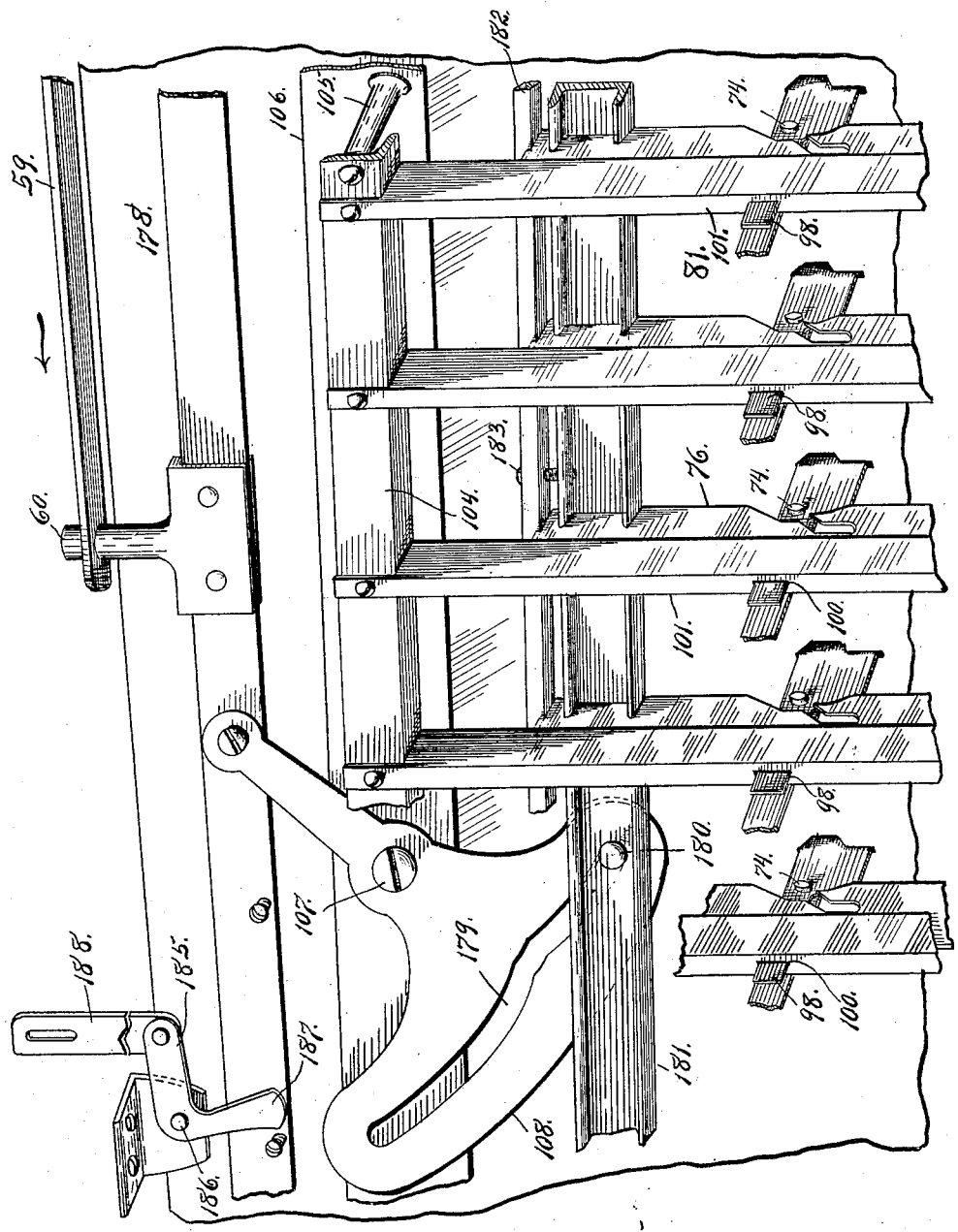

In the accompanying drawings, Figure 1 is a front elevation of my improved voting machine as it is erected ready for use in an election. Fig. 2 is a top plan view of the same. Fig. 3 is a front elevation of the same machine, with its legs folded up so as to make the machine as compact as possible for transportation. Fig. 4 is a top plan view of the same. Fig. 5 is a front elevation of the part of the keyboard of the machine. Fig. 6 is a cross section on the line 6, 6, of Fig. 5, the section, however, not being taken through the counters. Fig. 7 is a vertical section on the line 7, 7, of Fig. 6. Fig. 8 is a vertical section through the machine, showing an interlocking channel, keys and counters and free ballot device. Fig. 9 is a rear elevation of the lower right hand corner of the interlocking system, showing a straight irregular lock out. Fig. 10 is a sectional elevation of one of the free ballot depositing devices. Fig. 11 is a sectional plan through the machine on the line 11, 11 in Fig. 12, showing the straight irregular and the single candidate irregular depositing device. Fig. 12 is a sectional elevation of the straight irregular on the line 12, 12 in Fig. 11. Fig. 13 is a sectional elevation through the free ballot depositing device showing the free ballot receptacle under the machine. Fig. 14 is a plan view of the base of the machine, with a portion of the base plate broken away, showing the free ballot receptacle below it. Fig. 15 is a perspective view of the top part of the back of the machine, showing the universal bars by means of which the counters are actuated. Fig. 16 is a perspective view of the interlocking channels and the woman's lock out. Fig. 17 is a rear elevation of the woman's lock out and the yes and no lock out. Fig. 18 is a detail of the yes and no lock out. Fig. 19 is a sectional elevation of Fig. 17 on the line 19, 19. Fig. 20 is a section of the line 20, 20 in Fig. 17. Fig. 21 is a perspective view of the yes and no lock out. Fig. 22 is a front elevation of the yes and no lock out. Fig. 23 is a detailed view of the yes and no lock out. Fig. 24 is a detailed elevation of the arm on the end of the machine. Fig. 24^A is the pawl of the full stroke device of Fig. 24. Fig. 25 is a plan view on the line 25, 25 of the Fig. 24. Fig. 26 is a detail of the full stroke device. Fig. 27 is a sectional elevation of the straight ticket levers of the machine. Fig. 28 is a detailed view of the straight ticket lever. Fig. 29 is a sectional elevation of the interlocking system of the machine. Fig. 30 is a rear elevation of the interlocking system of the machine. Fig. 31 is an elevation of the interlocking channel at the top of the machine which makes the interlocking system interchangeable. Fig. 32 is a top plan view of Fig. 31. Fig. 33 is a section on the line 33, 33, of Fig. 31. Fig. 34 is a detailed perspective view of the adjusting block of the top interlocking channel. Fig. 35 is a cross-section of the upper part of the machine, showing the arrangement of the keys, counters, guides, universal bars and interlocking channels and the operating parts and the supports. Fig. 36 is a sectional elevation, showing the detail of the means for fastening the face plates on the machine. Fig. 37 is a sectional elevation of the machine as it may be constructed so that the operation of every universal bar will be registered on a separate counter. Fig. 38 is a perspective view of the voting key and interlocking wedge provided with the indorsed candidate wedge. Fig. 39 is a detailed view of a holder that is used in the straight irregular or the irregular of the electoral ticket or of large multi-candidate groups.

In Fig. 1, reference character 50 refers to the body of the machine, which is supported on legs 51, which are hinged at the bottom of the machine at 52. These legs are braced to the bottom of the machine by means of the braces 53, which are connected to the bottom of the machine at 54 and to the legs at 55. These legs 51 turn up to the position shown in Fig. 3, when it is desirable to pack the machine for transportation, in which case the same braces 53 which lock the legs down can also lock them up. The machine itself carries on the left hand end in Fig. 1 a door or gate 56, which the voter swings before he casts his vote and swings again after he has cast it. This gate is pivoted on a shaft 57, which at the top carries a crank 58 which reciprocates a connecting rod 59 by means of which the operating and resetting mechanism on each side of the machine is operated through a pin 60.

In Figs. 7 and 8, 61 refers to the voting key. This voting key projects through suitable openings 62 in the face plate 63 of the machine, which openings are provided with collars 64, which are screw-threaded, as is shown in Fig. 7. The voting key has a slot 65 which embraces the pin or shaft 66 which pin carries the counters, the slot 65 enabling the key to slide back and forth on the shaft 66 which serves as a guide for it. Each voting key carries the pallets 67, and 68 by means of which the star wheel 69 of the counter is actuated one-tenth of a revolution as the voting key is reciprocated, by the combined efforts of the voter and the machine. The star wheel 69 is carried on the shaft 70 which carries the transfer mechanism of the counter and has positively connected to it a gear of any number of teeth 71, which meshes with a gear of like number of teeth 72 on the units' wheel 73 of the counter. Each voting key carries a pin 74. When the key is pushed in by the voter, the pin 74 runs against the surface 75 of the universal bar 76 which prevents its further movement, and the pallet 67 in that case is stopped just short of imparting any movement to the star wheel of the counter. When the machine is reset by the voter, the universal bar 76 is raised, and the cam 77 engages with the pin 74, pulling the pin farther in into the recess 78, by which time the universal bar has completed its upward movement. The universal bar then begins the descent, and the cam 78 strikes the pin and shoves it out, then the flat surface 75 passes the pin, then the cam 79 engages with the pin and shoves it out still farther until the flat part 80 reaches the pin, when the downward movement of the universal bar is completed. The universal bar reaches this position when the voter has completed swinging the gate on the end of the machine after he has finished voting, and as long as the gate remains in this position, all the keys on the machine will be locked against movement, and while they are in this position, the pallet 68 is in engagement with the star wheel 69, which prevents its rotation, and as the counter is positively geared to the star wheel by the Geneva stop movement, shown in Fig. 6, the movement of any of the counter wheels is effectively prevented.

81 refers to the main plate of the machine, which plate is shown in section in Fig. 6. Between it and the keyboard of the machine is formed a compartment which contains the counters, and between it and the back plate 82 of the machine, as is shown in Fig. 13, is formed the compartment which contains the interlocking mechanism, which by the main plate of the machine is completely cut off from the counters, so that when the interlocking mechanism alone is exposed the counting mechanism cannot be interfered with, and when the counting mechanism only is exposed the interlocking mechanism cannot be interfered with. The voting key carries the pin 83 which is riveted to it, and on this pin is pivoted the interlocking wedge 84, which is free to rotate about the pin and is detachable therefrom. This interlocking wedge is in fixed engagement with the voting key and projects rearwardly therefrom and passes between the interlocking blocks 85 carried in the channel 86, which is placed just behind each office group of keys and runs parallel therewith. The channel is shown in sectional elevation in Fig. 8 and in cross section in Fig. 11 and in perspective in Figs. 16 and 21. The channel is formed of sheets of thin brass which are drawn to the shape shown in Fig. 16, two of these plates being placed facing each other and riveted together by the rivets 87 and spaced apart by the washers 88, so that there is room enough in the slot 89 for the interlocking wedges to pass into and through the channel from side to side. The rivets 87 and washers 88 are placed at regular intervals along the channel to properly hold the channel plates together and space them apart so as to keep the opening 89 of even width throughout the length of the channel, and these rivets are preferably placed just below the space where each interlocking wedge enters the channel, so that they do not in any way interfere with the relation between the interlocking wedges 84 and the channel blocks 85. The channel blocks are formed of thin pieces of metal that are cut into required length, so that when the wedges and channel blocks are assembled in the channel, each wedge will be positioned at the same angle with its voting key as are all the other wedges, and will consequently make the same angle with the channel blocks. It will be seen from the drawings that the width of the interlocking blocks is placed transversely of the wedges and that the ends are rounded, as is shown in Fig. 8, so as to reduce the error to a minimum as the wedges are inserted and the blocks rise with them. These interlocking channels are fastened at the bottom to a channel plate 90, which runs the whole length of the machine. This fastening is riveted by a pair of angle irons which may be clamped to the outside of the channel itself, in which case a spacing block must be placed inside of the channel to keep the channel plates apart, or, preferably, I may use the angle irons themselves as the spacing block, so that they will clamp between the channel plates by rivets which pass through both the channel plates and the angle irons, as shown at the bottom of the channel in Fig. 8, the angle irons in turn in either case being clamped to the channel iron 90 at the bottom of Fig. 8.

91 refers to the free ballot receptacle which is shown in the sectional elevation in Fig. 8 and shown in plan in cross-section in Fig. 11. The free ballot receptacle has connected to it an angle iron 92 which is shaped in many respects just like any of the voting keys, with the modification that it does not operate any counter and it is not operated by a straight ticket lever. It is provided with the slot 93, which embraces a pin 94, which serves as a guide for it. It carries a pin 74 similar to any other pin of the voting keys, which engages with a cam 95, by means of which the free ballot mechanism is pulled in to deposit the ballot which it may contain when the arm on the end of the machine is operated by the voter. This slot is of such a shape as to carry the free ballot mechanism in farther than any of the voting keys, as will be seen on a comparison between the position of the recesses 78 and the end 96 of the cam 95, the object being to pull the free ballot mechanism in far enough to permit the free ballot to drop through the slot 97 in the bottom of the machine. The resetting of the free ballot mechanism is provided for by the cam 98, which serves to positively return the free ballot mechanism and lock it against operation. The ends $98^a$ of the voting keys, and 99 of the free ballot depositing mechanism, all pass through slots 100 in the guide plate 101, as shown in Figs. 8, 15, 29, and 35. By means of these plates, the voting keys are held to a strictly longitudinal movement as they are moved backward and forward either by the voter or by the machine. These guide plates 101 are formed as an angle iron and are fastened at the bottom of the machine to an angle at 102, which in turn is fastened to the bottom plate in the machine 103, and at the top of the machine they are fastened to the angle iron 104, which in turn is supported from the main plate of the machine by means of the posts 105. The main plate of the machine is stiffened along this line by means of the stiffening bar 106, which runs the whole length of the machine and supports both the posts 105 and the pivots 107 of the swinging cams 108. These guide plates 101 also serve as guide plates for the universal bars 76. The universal bars 76 are provided with a slot 109 at each end thereof, which slot engages with the pin 110 carried by the guide plate 101, so that by means of the guide plate and these pins carried thereby in the slots at each end of the universal bar, the universal bar is guided in its reciprocation. It will be understood that there is one of these guide plates and one of these universal bars for each single candidate group of keys or each vertical row of keys, each vertical row constituting a single candidate group. The interlocking channels 86 are connected at the top to the grouping channel 111, which runs the whole length of the machine. Each channel 86 at its top carries a block which is riveted between the channel plates and which is provided with a screw hole, with which the screw $112^a$ engages, thus holding it longitudinally in engagement with the channel 111 and forming a rigid structure in connection therewith.

As may be seen from Fig. 8 and others, between each two wedges 84 is placed a spacing or interlocking block 85, which arrangement is continued to the top of each channel, and on top of the top key is placed the block 112, which has connected thereto a spear head 113, which is pivoted to the block 112 at 114. As the keys are shoved in in any one channel, the wedges 84 spread the blocks 85 and raise the spear head 113 through the channel 115. The channel 115 carries a series of blocks 116, one of which is placed between each pair of spear heads. These blocks as well as the channel bars are provided with pin holes 117, so that grouping pins may pass therethrough and hold the locking blocks against movement by the spear head. As is shown at the top of Fig. 30 all of the channel blocks 116 are held against movement except one, thus making a multi-candidate group of two in one place, and making single candidate groups with all the rest. When one key is inserted in the multi-candidate group, the spear head above it is raised one step by the key. If the second key be pushed in in the same channel, the spear head will then be raised a second step, displacing the block against the other spear head and locking it against being raised, and, consequently, locking all the keys below it against being pushed in. It will be seen that any desired number of spear heads may thus be thrown together into a multi-candidate group and that the system will be locked against further voting operation when the predetermined number of keys have been operated by the voter. The channel 111 is formed of two angle irons 118, which are kept at even distance from each other by means of the yokes 119 which occur at regular intervals along the machine. This channel 111 is supported at each end of the machine by means of the angle iron 121 and is braced at intervals against the guide plates 101 by means of the screw 120, shown in Figs. 29 and 30.

It sometimes happens in forming groups of large size that a number of keys greater than the number of single candidate groups which have been thrown together can be pushed in, in which case the voter can beat the machine by voting more keys than it is the intention of the machine to permit. In order to prevent this, I provide a means by which the extra lost motion in the channel 115 is taken up, and this means is shown at the top of Fig. 30. I provide, at regular intervals, a divided interlocking block 122, shown in detail in the Fig. 34 the upper part of which extends over the lower and the two parts of which are clamped together by means of the binding screw 123. Each part is serrated, the serrations coming about a fiftieth of an inch apart, so that a very fine adjustment can be had in widening the two parts of the block from each other or bringing them together. The two parts of the block remain in rigid engagement with each other by reasons of the intermeshing of these serrations and by their being further clamped together by means of the binding screw 123. Thus, if there is an excess of lost motion in the interlocking mechanism of a multi-candidate group so that the machine can be beaten in that group, the excess may be taken up by means of this adjustment and the interlocking mechanism be made accurate in its performance.

The manner of depositing the free ballot on my machine may be understood by reference to Figs. 8, 10, 11, 12, 13 and others. When a voter wishes to vote for a candidate who has not been nominated by any of the parties in a single candidate group, he writes the name of the person for whom he wishes to vote on a card and places the card in an opening 124 of the free ballot receptacle shown in Fig. 11. He then pushes the free ballot receptacle in, and the wedge 84 of the free ballot device raises the interlocking blocks and spear head the same as if any key had been shoved in in that channel. There is nothing to obstruct pulling back the free ballot depositing device and taking the card out of it, just the same as there is nothing to obstruct him pulling back any key which he may have shoved in in order to change his vote. But having voted in this way, when he leaves the machine, the free ballot depositing device is further pulled in by the cam 95 engaging with the pin 74 in the Fig. 8, on a line with the recess 96, in which case the opening of the free ballot depositing device coincides with the opening 97 in the free ballot receptacle when the card drops through the opening 97 through the chute 125 into the receptacle 126, shown in Figs. 13 and 14. It will be understood that the base plate has an opening in it for each free ballot depositing device, and in each opening there is a chute 125 which directs the cards into a separate part of the trough 126, so that the free ballots deposited in the machine are kept separate according to the office in the trough 126, where they can be inspected after the election is over. The arrangement of the trough 126 can be readily understood from Fig. 13. It has a hasp 127 on it which projects when the trough is closed through an opening 128 in the front of the machine, and, by means of the lip 129 the trough may be locked by means of the lock 130. When the election is over and the free ballots are to be counted, the election officers unlock the lock 130 and allow the trough 126 to drop down as far as the chain 131 will permit it, when the contents of the free ballot receptacles may be inspected and counted.

When multi-candidate groups are to be provided for, it is necessary to prevent fraud upon the machine through the free ballot receptacles. Thus, if there is a multi-candidate group of two or more and it were possible to cast a ballot to each of the free ballot receptacles of the multi-candidate group, it might be possible to vote twice for the same man by writing his name on a separate card for each separate depositing device and vote these cards through the depositing devices. I provide several means in which this may be prevented, the first of which is shown in Fig. 8. The wedge 84 of the free ballot depositing device is continued on through the interlocking channel 86, and at its end carries a broad plate 132 in which is provided a recess 133. Back of the interlocking channels runs a rod 134. This rod runs the whole length of the machine, and on it I pivot a plate of metal 135, such as is shown in Fig. 16. This sheet of metal is bent in such a shape as to hook over the rod 134 on which it swings. The end 136 of this plate of metal engages in the recess 133 of the free ballot wedges, positively locking them against movement independent of each other. This metal plate 135 also carries a fork 137 riveted to it, which fork straddles one of the interlocking channels 86 which holds it against endwise movement. The screw 138 holds the plate 135 permanently on the rod 134 so that it cannot move either lengthwise or up and down. In Fig. 16 is shown a multi-candidate group of four provided in this way. Now, if a single key be inserted anywhere in the group and the interlocking mechanism has been properly adjusted to a multi-candidate group of four, it will be impossible to shove in any one or all of the free ballot mechanisms. By reason of the provision shown in Fig. 16 it will be seen that in order to operate any free ballot depositing devices, they must all be operated as the metal sheet 135 compels them to move together. But if there is only room in the interlocking system for three of the wedges to be inserted, then in the wedge of each free ballot depositing device can only be inserted three-fourths of the distance, which effectually prevents the pin 74 from passing the top of the cam 95, so that the free ballot cannot be operated at all. In consequence of which, if a voter desires to vote for one candidate in this multi-candidate group who has not been nominated and for three others that have been nominated, it is necessary for him to vote for all the candidates for this office through the free ballot depositing device, and in order to prevent him from voting for the same man more than once without detection, I block up or plug up all of the free ballot receptacles except one, so that a card can be inserted in one, and one only, which card must bear the names of all the candidates for that office for which the voter wishes to vote, and thus fraud on the machine through the free ballot mechanism is effectually prevented. I may provide for this by disconnecting all the wedges of the free ballot depositing devices and attaching to one of the free ballot depositing devices an interlocking wedge which will raise the blocks in that channel four times as much as the wedge which was removed, blocking up the remaining free ballot receptacles. In this case, it is not necessary to use the metal strap 135 to tie the free ballot receptacles together or block the remaining ones up, and, in fact, the other three free ballot receptacles should be locked out of operation in any suitable way that will prevent them from being pushed in. I also provide improved means by which any number of the channels or groups may be locked against operation by women, which is ordinarily called the woman's lock out. This is shown in section at the bottom of the left hand side of Fig. 8 and at the bottom of Fig. 16. 139 refers to the sliding channel which is recessed through its length so that suitable wedge blocks 140 can be placed therein. This channel is reciprocated by means of a wrench 144, which is put on the square stud 143, as may be seen in Figs. 17 and 19. The yoke 141 communicates its motion to the sliding channel 139 by means of the pin 147 sliding in the slot 145 in the piece 146, which is screwed to the bottom channel iron 90 to which the interlocking channels are fastened. The channel 139 slides on this bottom channel iron 90 as it is moved back and forth by means of the wrench 144, and the wedges 140 carried therein raise the free ballot wedges 84, and with them all of the interlocking blocks and wedges and the spear head in that channel, so as to take up all of the loose space in the top channel of the machine, in which case all of the groups designated by the wedges 140 will be locked against operation. If it is desired, each wedge may be placed in this woman's lock out so that instead of locking against a particular class of voters, it may be used to lock up the whole machine against voting operation. I also provide means for locking up the machine through the straight irregular ballot receptacle. As shown in Fig. 11, I provide my machine with a straight irregular free ballot receptacle 148. By the operation of this straight irregular receptacle, I provide for locking up all of the groups throughout the machine by the following means:—The straight irregular ballot device extends back so that instead of carrying a wedge such as is carried by all the rest of the free ballot depositing devices, it carries at the end of the connecting bar or plate 149ᵃ a plate 149, which is at right angles to the free ballot depositing device itself and at right angles to all of the interlocking wedges carried by the keys and free ballot depositing devices. This plate 149 carries a cam slot 150 which engages with the bell crank lever 151, and, as the free ballot receptacle is pushed in, the cam slot 150 engaging with the pin 152 carried by the bell crank lever 151, forces said pin outwardly in the cam slot 150 until it has passed the corner 153, when the bell crank lever ceases to rotate with the further movement of the free ballot depositing device. This is shown in elevation in Fig. 12, and, at the point where the pin 152 passes the corner 153, the pin 74 on the free ballot depositor runs into the cam 98, which prevents it from moving farther until the machine is reset. The locking of the bell crank lever holds the link 154, which is pivoted to a bar 155, which runs immediately under all of the free ballot wedges to the whole length of the machine. This bar 155 is carried at intervals on swinging links 156, which are pivoted to the channel iron 90, so that as the bell crank lever swings in the direction of the arrow shown in Fig. 11, the links 156 rock and throw the bar 155 up against all of the free ballot wedges, raising them and all the interlocking pieces in their channels, thus effectually locking up the whole machine. This is done every time the free ballot depositing device is pushed in, and, by providing means which will lock the straight irregular in, I can provide for locking up the whole machine in this way as well. The movement of the wrench on the stud 143 not only operates the woman's lock out, but also operates the yes and no lock out, since it operates the crank 157, which carries a pin 158, which engages with the slide 159 by means of the slot 160 carried therein. As shown in Fig. 22, the yes and no keys are placed in a single channel alternating with each other and grouped in pairs by the interlocking mechanism, so that in any one question, if the yes key is voted, the no key cannot be voted. The grouping is provided for in the construction of the channel 161. Instead of the alternate washers, is used a block 162, Fig. 21, which forms an abutment which limits the size of the group to two keys in each case. The wedges and interlocking blocks are so placed between these abutments so that only one key can be inserted, and when one key is pushed in, the other key is locked out. It is obvious that if I provide for a movable abutment, then neither key can be shoved in, and this is provided for by means of the bar 159, which runs the full length of the yes and no channel, and at regular intervals carries lugs 164 so placed that when the bar 159 is pulled down by means of the wrench 144 and the crank 157, the lugs 164 will engage with the top key in each group and pull it down so that it cannot be raised, which is necessary in order to shove either key in, and thus, wherever a lug 164 occurs in its proper place on the bar 159, that group of yes and no keys will be locked against operation, and this lock out is operated every time that the woman's lock out is operated by the wrench 144. As will be seen in perspective in Fig. 21 and the elevation in Fig. 2, I provide a second stud 165, by means of which the bar 166 may be pulled down, and this bar 166 carries lugs 167 which are similar to the lugs 164, which are carried by the bar 159, shown in Fig. 22. The bar 166 is operated through the crank 168, which carries a pin on its end 169, which engages with a slot 170 in the bottom of the bar 166, so that when this crank is turned the bar is drawn down until the lugs 167 in each case rest upon the top key of each group, which prevents it from rising sufficient for either wedge to pass the interlocking block, and thus the yes and no keys may be locked out, together with the woman's lock out, by the operation of a single wrench, or they may be locked out separately from the woman's lock out by another similar wrench.

Figs. 27 and 28 show details of the ticket levers 171, which operate across the face of the machine by a straight downward pull, as may be seen in Figs. 1 and 3. A straight ticket lever 171 is provided for each party on the keyboard of the machine. This lever is pivoted to the rock shaft 172, which is pivoted in the machine and extends back into the counter compartment where it carries the arm 173. In the end of the arm 173 is a slot 174 with which engages the arm 175, which is pivoted at 176. The rocking of this arm 175 around the pivot 176 rocks the straight ticket bar 177 in the manner shown in the lower part of Fig. 27. These straight ticket bars 177 are shown in cross-section in Fig. 8, and each straight ticket bar or rock shaft runs the whole length of its party row, so that when it is rocked to the position shown in Fig. 27 all of the individual candidate keys in that party row are carried in by it to voted position. The pulling back of any individual candidate key rocks the straight ticket lever back to its initial position. It is obvious that if the interlocking mechanism of the machine has been properly set and a straight ticket has been voted, no other keys can be voted among the candidate groups, unless a corresponding voted key is restored to its initial position. In consequence of which, if a key is voted in one party row, it will be impossible to operate a straight ticket lever of any of the other party rows.

By reference to Fig. 15 will be seen the means which I employ for securing the registration of a vote and resetting and locking the voting keys. On top of the machine is carried a connecting rod 59 which is connected to a pin 60, which passes through a slot in top of the casing, so that it can reciprocate in direction of the arrow shown at the top of Fig. 15. The pin 60 is fastened to a bar 178 which runs along the top of the machine, and, at regular intervals, has connected to it rocking cams 108. These rocking cams are pivoted at 107 to the bar 106 which carries them. The cam 108 has a cam slot 179 cut therein. This cam slot 179 engages with a pin 180 carried on the channel bar 181. There is a series of these rocking cams connected to the bar 178 pivoted to the plate 106 and operating to raise and lower the channel bar 181 by means of the pins 180. As the rocking of them is simultaneous, the bar 181 will be lifted equally throughout its whole length. This bar 181 is provided at its ends with feet which bear against the end plates of the compartment on which it is contained, and thus it is held against longitudinal movement, but is free to rise and fall as it is raised and lowered by the cams 179. The universal cam bars 76 are recessed at their top so as to engage with the channel bar 181, as is shown in Figs. 15 and 35. These universal bars are held in engagement with the channel bar, by means of the guide plates 101. They are also kept from sliding along the channel bar by means of the bar 182, which is grooved so that the universal bars are positively placed at regular intervals along the channel bar and held thereby rigidly against movement along the channel bar. The bar 182 is secured in place in turn by means of the screw 183, which connects it rigidly to the channel bar. Thus, the swinging of the arm on the end of the machine will raise and lower the universal bar according to the needs of the voting operation. When the voter wishes to vote, he swings the arm 56 on the end of the machine to the position shown in Fig. 2, in which figure the keyboard of the machine is on the upper side. While the arm 56 is in this position, the universal bars, the channel bar and cam and cam plates are in the position shown in Fig. 15. After he has finished voting, he can take hold of the arm 56 and swing it through an arc of 180 degrees which will first raise the cam bars and pull all the keys indicated in far enough to operate their counters through the first step, and then lower them, which action will positively reset and lock all the voting keys. The operation of the arm 56 by the next voter to the position shown in Fig. 2 will then raise the universal bars to the position shown in Fig. 15, which will unlock the keys again for voting operation.

At the upper left hand corner of Fig. 15 is shown the means for operating the totalizing counter 184 shown in Fig. 1. This consists of a bell crank lever 185 pivoted to the plate of the machine at 186. The upper arm of the bell crank lever as it rocks reciprocates the link 188, which operates the totalizing counter once for every voter that swings the arm 56.

Reference to Figs. 30, 37 and 38 will show the means which I employ for providing for indorsed candidates. In my interlocking system, each wedge which is carried by the voting key is provided with a hole 189. The wedges 210 for indorsed candidates are provided with a pin which may be inserted through this hole by placing the indorsed candidate wedge at right angles to the regular interlocking wedge. After inserting it, it may be turned to the position parallel with the regular interlocking wedge which locks it securely to the regular interlocking wedge. The auxiliary indorsed candidate interlocking channel 190 is shown in Fig. 30. It consists of a detachable interlocking channel which can be applied to the side of any of the main interlocking channels with a series of interlocking blocks therein. The auxiliary interlocking wedges 210 are attached to the main interlocking wedges of the indorsed candidate and are then placed between the blocks in the auxiliary interlocking channel in just the same way as the main interlocking wedges are inserted in the main interlocking channel. The top block 191 is then adjusted to allow the voting of one of these wedges, and no more, and is locked in that position by means of the pin 192. Thus, it will be seen that in this particular multi-candidate group of the keys which have wedges interlocked by this auxiliary channel but one, and one only, can be voted. These auxiliary channels may be attached to any of the main channels, and where there is more than one group of indorsed candidates in a single interlocking channel, two or even three of these auxiliary channels may be attached to the main channel to interlock the keys of each indorsed candidate in a group separate by themselves, preventing the casting of more than one vote for any one candidate.

The counters on my machine are exposed to view in the same way, as is shown in any of my pending applications, by means of a reciprocating bar at the top, with cam slots therein which raises and lowers a bar, to which are fastened the counter-shutters 193, shown in Fig. 6, by means of which the count is either exposed to or concealed from view. This bar may be interlocked with the resetting mechanism of the machine in such a way that it cannot be moved unless the keys and counters are locked against movement, which means are shown fully in any of my pending applications. The shutter 193 is shaped so that it has flanges which embrace the counter wheels and hold them together, so that they will always remain in engagement with their transfer mechanism, as is shown in Fig. 6. The face plates of the machine are held on by means of the bars 194 which engage with a plate at the bottom of the face plate.

Figs. 24, 25 and 26 show details of how the arm or door 56 is secured to the end of the machine. 57 represents a vertical shaft which is carried on the end of the machine in bearings 195. The horizontal bars of the door 196 are made hollow so as to receive pins 197 which are carried on the shaft 57.

When the door 56 is placed on the pins 197, the holes through the top 196 register with the corresponding holes in the pins, so that a cotter pin 198 can be passed therethrough locking the two together and making the door a part of the machine. The vertical shaft 57 carries a pawl 199 which trails over a circular ratchet 200, shown in Figs. 24, 25 and 26 and which trips and swings in the reverse direction when the door has completed its stroke in either direction, so that while it does not obstruct the door in its forward movement, it prevents it from being reversed in its movement until it has swung to the end of its stroke. This door 56 may be covered with canvas, which may be strapped to it in order to more effectually screen the voter while he is standing in front of the keyboard of the machine.

In Fig. 37 I have shown a modification of my improved voting machine, in which a tell-tale counter is shown in each single candidate group. The universal bar 76, near its lower end, carries the projecting lip 215, which will always engage the elliptical stud 216 of the counter-actuator 217 of the totalizing counter 218. Every time the universal bar 76 is reciprocated, the counter-actuator will be moved and the counter will register one. Each single candidate group is provided with one of these counters for checking up the action of its bar. The numbers on these counters should agree with each other throughout the machine, and should also agree with the totalizing counter on the top of the machine.

In Fig. 39 I have shown a device for holding the free ballots of multi-candidate groups. The free ballot is written on a long strip of paper and folded up and placed inside of the clip 220, and this clip is then placed in the irregular device, as is shown in Fig. 37, which is then voted and is then deposited in the irregular receptacle through the opening 97, when the gate on the end of the machine is swung by the voter. The clip serves to keep all of the papers of its ballot together, so that, if any voter votes more than once for the same man, the fraud can be detected on the ballot thrown out.

In Figs. 24 and 25 are shown the means by which I lock up the machine. In these figures, 225 refers to an arm projecting out from the machine. In this arm is provided a hole 226 through which the pin 227 can be inserted. When the arm 228 of the full stroke device is in the position shown in Figs. 24 and 25, the pin 227 can be passed down through the hole 226 and through a corresponding hole in the bottom of the ratchet piece. This pin effectually locks the shaft on the end of the machine against rotation. The pin is held in place by a box 230 which is hinged at the right hand side of Fig. 24 by the hinges 229, and, when swung to its closed position, the top of it prevents the pin 227 from being withdrawn or tampered with. The box itself is shown in dotted lines in section in Fig. 25, and in dotted lines in elevation in Fig. 24. The box itself may be locked in position as follows:—When it is swung to the closed position indicated in Fig. 25, the arm 225 projects through and beyond the box in such position that the padlock 231 may be locked through a hole carried therein, thus effectually locking the box against opening, which prevents the releasing of the shaft from its locking position, which, in turn, holds the counting and voting mechanisms against movement. Thus, it will be seen that I have provided an easy and effective way of permanently locking the machine against operation.

In Fig. 31, the interlocking blocks of the top channel are shown with projecting pins 235, placed uniformly on one end of the interlocking blocks. The object of these pins is to prevent interlocking blocks from coming closer together than the distance which they should be properly spaced by the spears in their normal relation to the blocks. It sometimes happens, in large multi-candidate groups, that a spear is raised as many as five, six or seven steps and the adjoining spear is not raised at all. This means then that the spear may be withdrawn partially from between the blocks with which it interlocks as it swings with the blocks, so that the blocks would be allowed to come closer together than they should. In order to preserve the interlocking mechanism from this inaccuracy, these pins prevent the space between adjacent blocks from becoming less as the spear heads swing away from the vertical.

Having thus described the nature of my invention, what I claim as new is as follows:—

1. In a voting machine, the combination of a series of voting devices having projections thereon, a bar having recesses therefor, each of said voting devices being movable to engage its projection with the corresponding recess in said bar, by which the forward movement of said voting device is limited, and means operated by the exit of the voter to cause the longitudinal movement of said bar to operate the voting devices having projections in engagement therewith and register a vote thereby.

2. The combination in a voting machine of voting mechanisms arranged in single candidate groups, an interlocking wedge attached to each voting mechanism, channels and interlocking blocks parallel with each single candidate group, a channel, running transversely to each of said single candidate groups and containing interlocking mechanisms, and interchangeable grouping means carried by the said last named channel for combining the single candidate groups into multi-candidate groups, and vice versa.

3. The combination in a voting machine of voting mechanisms arranged in single candidate groups, interlocking mechanisms, channels which are individual to and parallel with single candidate groups, said channels carrying locking blocks which interlock with the said voting mechanisms, and independent means in connection with the interlocking blocks of consecutive channels permitting the voting mechanisms to be interchangeably grouped.

4. In a voting machine, the combination of voting mechanisms arranged in single candidate groups, a locking channel for each group, blocks and wedges in said channel, said blocks being in constant engagement with said wedges, and means connecting said channels together for multi-candidate voting.

5. The combination in a voting machine of voting mechanisms arranged in groups, interlocking mechanisms, consisting of wedges pivotally attached to said voting mechanisms and blocks running parallel with each group of voting mechanisms, and interchangeable means for combining two or more of said groups of voting mechanisms into a multi-candidate group, or for dividing a multi-candidate group into smaller groups.

6. The combination in a voting machine of groups of voting mechanisms including keys, interlocking mechanisms, consisting of wedges pivotally attached to said keys, and blocks, individual to and parallel with said groups of voting mechanisms, and interchangeable grouping mechanisms which will lock the keys in each group when the predetermined number have been voted, whether they are voted simultaneously or singly.

7. The combination in a voting machine of voting mechanisms arranged in groups, and interlocking mechanisms consisting of wedges and blocks individual to and parallel with each group of voting mechanisms, said interlocking mechanisms being connected by a single auxiliary interlocking channel containing wedges, and adjustable stops for interchangeably grouping the voting mechanisms.

8. In a voting machine, the combination of voting mechanisms arranged to form a single candidate group, a wedge removably attached to each of said mechanisms and interlocking blocks in continuous contact with said wedges, said interlocking blocks being perpendicular to the plane of said wedges and located sidewise in relation thereto.

9. The combination in a voting machine of voting mechanisms, including keys, and interlocking mechanisms, said interlocking mechanisms being placed individual to and parallel with each group of voting mechanisms, and including wedges pivoted to said voting mechanisms and interlocking blocks carried by the channel interlocked with the wedges carried by the keys, said interlocking blocks being perpendicular to the line of movement of the wedges.

10. In a voting machine, an interlocking system comprising a channel, interlocking blocks in said channel, and wedges in constant engagement with said blocks, said blocks being perpendicular to said wedges and beveled off to form a line contact therewith.

11. In a voting machine, the combination of an interlocking system, comprising a channel and flat faced interlocking blocks and wedges in said channel and a series of voting mechanisms arranged in a plane perpendicular to the plane of the interlocking blocks, including keys, said wedges being attached to said keys and in constant engagement with said blocks.

12. The combination in a voting machine of voting keys, interlocking wedges pivotally attached thereto, the interlocking wedges being normally between centers a distance equal to the distance between centers of the voting keys, and flat faced interlocking blocks in length substantially equal to the distance between centers of the voting keys, the plane of said interlocking blocks being transverse to the plane of the movement of the interlocking wedges.

13. In a voting machine, a single candidate group having in combination an interlocking system comprising a channel, wedges and beveled interlocking blocks and a series of voting mechanisms, said wedges being pivotally attached thereto and in permanent contact with said blocks, and also perpendicular to the plane of said blocks and in line contact therewith, said channel serving as a guide for said wedges and blocks.

14. The combination in a voting machine of a channel, interlocking wedges and flat faced blocks, the channel having an opening T-shaped in cross section, the long part of which T-shaped opening guides the interlocking wedges, said interlocking wedges and blocks being held in engagement with each other at the intersection of the two openings, and said wedges being perpendicular to the plane of the interlocking blocks.

15. In a voting machine, an interlocking channel, composed of two similar halves, each half having a groove therein, forming when the halves are placed together a T-shaped opening, in combination with flat faced interlocking blocks in said channel, and wedges perpendicular to the plane of said interlocking blocks.

16. The combination in a voting machine of an interlocking system, comprising wedges carried by the voting devices, and interlocking blocks carried by the interlocking channel and interlocking with said wedges, wedges placed at the tops of said interlocking channels, an auxiliary channel common to all of the interlocking channels, and interlocking blocks therein.

17. The combination in a voting machine of a series of interlocking channels provided with wedges and blocks, a spear head carried at the top of each interlocking channel, and an auxiliary channel containing interchangeable interlocking means with which said spear heads engage.

18. The combination in a voting machine of a series of single office groups, a locking channel for each group, blocks and wedges in said channel, said blocks being in constant engagement with said wedges, and interchangeable means connected to one end of each channel for interlocking said channel with the adjoining channels, said means being common to all of said channels.

19. The combination in a voting machine of a series of interlocking channels, provided with wedges and blocks, and a single interlocking means common to a series of said channels, said means including a take-up device for taking up the excess of lost motion.

20. The combination in a voting machine of a series of interlocking channels, a grouping and interlocking channel transverse thereto and connected therewith, and means carried by said grouping channel for interchangeably grouping the individual channels.

21. The combination in a voting machine of voting mechanisms arranged by single candidate groups, having interlocking system for each single candidate group, consisting of an interlocking channel, blocks and wedges, wedges at the free end of each interlocking channel, a grouping channel with interlocking blocks with which said wedges engage, and means for interchangeably grouping said single candidate groups.

22. In a voting machine, the combination of a counter actuator, pallets thereon, said actuator being capable of voting movement, a resetting means, means carried by said actuator to contact with said resetting means and limit the voting movement of said actuator, said resetting means being adapted to be operated by the voter, after voting, to operate the counter actuator and reset and lock it.

23. The combination in a voting machine of a counter, and a star wheel, a key, pallets thereon engaging said star wheel to drive it, a universal bar for operating the key, a pin on the key for engaging with the bar, said bar being shaped to engage with the pin and move the key, and means for moving said bar.

24. The combination in a voting machine of voting keys carrying counter-actuating means, counters operated thereby, said keys being movable freely into and out of voted position, and means common to each group for advancing the keys which have been actuated by a voter to operate the counters thereof, said means also operating to reset said actuated keys.

25. The combination in a voting machine of voting keys carrying counter-actuating means and arranged in groups, said keys being movable freely into and out of voted position, and means common to each group for advancing keys that have been left in voted position, and for locking them against manual operation.

26. The combination in a voting machine of voting keys carrying counter-actuating means, counters therefor, said keys being movable freely into and out of voted position, and a universal bar common to all the keys of each group for advancing keys that have been placed in voted position to operate the counters and positively reset said keys and move the corresponding counters and lock the counters against voting operation.

27. In a pull back voting machine, the combination of keys capable of voting operation, counters and means operated by the voter before voting to unlock the keys for voting operation, said means being operated by the voter after voting to advance the keys operated and positively reset and lock them, the movements of the keys by the machine operating to move the corresponding counters one step.

28. The combination in a voting machine of the voting keys and counters therefor, said keys being movable freely into and out of voted position without moving the counters, and a universal cam bar in each group for moving the keys selected to operate the corresponding counters and positively reset and lock the keys and counters.

29. The combination in a voting machine of a series of voting keys and counters therefor, said keys being movable freely into and out of voted position with their counters, and a universal cam bar operating to move the selected keys to operate the corresponding counters and reset the selected keys and lock both keys and counters.

30. The combination in a voting machine of a group of keys movable into and out of voted position, a counter for each key, and a cam bar which operates to advance the key placed in voted position and to reset the key and lock it against operation.

31. The combination in a voting machine of a series of keys, a counter for each key, and a universal cam bar moving transversely to said series of keys to reciprocate selected ones to register a vote, means carried on the outside of the machine to operate said universal bar before and after voting.

32. The combination in a voting machine of a series of groups of keys, a universal cam bar for operating the selected keys of each group, all of said universal bars being connected to a single bar, and means for operating said single bar, which means are moved by the voter before and after voting.

33. The combination in a voting machine of a series of groups of voting mechanisms, a single operating bar, a universal resetting bar for each group of mechanisms and operating cams, said series of universal bars being attached to the single bar and reciprocated by said cams which are operated by the voter before and after voting.

34. The combination in a voting machine of keys arranged in single candidate groups, a counter for each key and operated thereby and a cam bar individual with each group for reciprocating the keys to operate the counters and reset the keys.

35. The combination in a voting machine of keys arranged in single candidate groups, a counter for each key and operated thereby and a cam bar individual to each group to reciprocate the keys to operate the counters and rest and lock the keys.

36. The combination in a voting machine of keys arranged in single candidate groups, a counter for each key and operated thereby and a cam bar individual to each group for operating the counters and reciprocating the keys and locking both keys and counters against operation.

37. The combination in a voting machine of voting mechanisms, consisting of keys and counters, a cam bar limiting the voting movement of the key, and means on said bar to move the key to operate its counter and positively reset the key.

38. The combination in a voting machine of a voting key and counter, said key moving transversely of and inclosing the axis of its counter, and having a slot which guides said key on the axis of said counter.

39. The combination in a voting machine of keys and counters, interlocking wedges pivoted to, and in constant engagement with said keys, and a channel containing flat faced interlocking blocks the edges thereof being parallel with said keys and interlocking with the wedges carried by said keys, said blocks being placed edgewise in relation to said wedges.

40. In a voting machine, a single candidate group consisting of keys, counters and interlocking mechanism, all arranged substantially in the same vertical plane, and interlocking wedges pivoted to said keys, said interlocking mechanism including interlocking blocks movable in the plane of the single candidate group and interlocking with said wedges, said blocks being beveled off so as to contact with said wedges only on a line.

41. In a voting machine, the combination of keys and counters, interlocking wedges detachably connected to said keys, a channel containing beveled interlocking blocks, said wedges being in constant engagement with the edges of said blocks, all of said parts being arranged in substantially the same vertical plane, and the plane of said wedges being perpendicular to the plane of the interlocking blocks.

42. The combination in a voting machine of keys and counters and interlocking wedges therefor, arranged in single candidate groups, an interlocking channel individual and parallel thereto, a free ballot depositing device at one end of said interlocking channel interlocked with the regular voting mechanisms, and means inclosed within the machine for connecting a plurality of said free ballot mechanism together for simultaneous operation.

43. The combination in a voting machine of voting mechanism and interlocking mechanism arranged in single candidate groups, a free ballot depositing device individual to each single candidate group, and means inclosed within the machine for connecting a plurality of said free ballot mechanisms together for simultaneous operation.

44. The combination in a voting machine of voting and interlocking mechanisms, arranged in single candidate groups, a free ballot mechanism individual to each group, and pivoted means for connecting a plurality of said free ballot mechanisms for simultaneous operation.

45. The combination in a voting machine of voting mechanisms and interlocking mechanisms therefor, arranged in single candidate groups, a free ballot mechanism individual to each group, and a pivoted plate for connecting a plurality of said free ballot mechanisms for simultaneous operation.

46. The combination in a voting machine with individual voting mechanisms, of regular and free ballot voting mechanisms and interlocking mechanisms therefor, arranged in single candidate groups, and means for connecting a plurality of said free ballot mechanisms for simultaneous operation, said means consisting of a pivoted means engaging with each of the free ballot mechanisms so connected.

47. The combination in a voting machine of regular and free ballot mechanisms, arranged in single candidate groups, interlocking mechanisms therefor, and means for connecting a plurality of said free ballot mechanisms for simultaneous operation, said means consisting of a plate pivoted in position to engage with recesses carried by the said free ballot mechanisms to be connected.

48. The combination in a voting machine of regular and free ballot voting mechanisms, interlocking mechanism therefor, means for connecting a plurality of said free ballot mechanisms for simultaneous operation, said means consisting of a pivoting rod, a plate pivoted thereon, to engage with all the free ballot mechanisms so connected, and means carried on said plate to prevent longitudinal movement of said plate.

49. The combination in a voting machine of regular and free ballot voting mechanisms, arranged in single candidate groups, interlocking mechanism therefor, means for connecting a plurality of free ballot mechanisms for simultaneous operation, said means being pivoted in position to engage the free ballot mechanisms to be connected, and means for preventing longitudinal movement of said means.

50. The combination in a voting machine of regular and free ballot voting mechanisms, arranged in single candidate groups, and means for connecting a plurality of said free ballot mechanisms for simultaneous operation, said means consisting of a plate pivoted on a shaft and carrying a fork which engages one of the interlocking channels to prevent its movement along the shaft.

51. The combination in a voting machine of regular and irregular voting mechanisms, wedges attached thereto, a channel with blocks for interlocking said wedges, the wedge of said free ballot mechanisms being provided with a notch, and means engaging with the notches of a plurality of said free ballot mechanisms for connecting them together for simultaneous operation.

52. The combination in a voting machine of regular and free ballot voting mechanisms, arranged in single candidate groups, interlocking mechanisms therefor, and separate means for each single candidate group for operating both the regular and free ballot mechanisms to register a vote.

53. The combination in a voting machine of regular and free ballot voting mechanisms, arranged in single candidate groups, and a cam bar universal to the voting mechanisms of each group for registering the votes indicated on each voting mechanism.

54. In a voting machine, the combination of regular and free ballot voting mechanisms arranged in single candidate groups all moving parallel with each other and in substantially the same plane, and separate means for each group moving parallel with each of said voting mechanisms to move the free ballot mechanisms into position to deposit a vote and thereafter to reset them.

55. The combination in a voting machine of regular and free ballot mechanisms, arranged in single candidate groups, interlocking mechanisms for each group, and a universal cam bar for each group moving substantially in the plane of each group and moving said free ballot mechanism from voting position to depositing position and resetting it.

56. In a voting machine, the combination of regular and free ballot voting mechanisms arranged in single candidate groups, all of such mechanisms moving parallel to each other and being arranged in the same plane, and operating means individual to each group and moving substantially in the plane of the voting mechanisms, said means operating to move the regular voting mechanisms a certain distance and to move the free ballot voting mechanisms a greater distance.

57. The combination in a voting machine of regular and free ballot voting mechanisms, arranged in single candidate groups, and means individual with each group and lying parallel thereto and moving parallel to said group for operating the voting devices to register votes, said means being provided with cams of different depth, certain of said cams being adapted to actuate the keys to operate the counters.

58. The combination in a voting machine of regular and free ballot mechanisms, arranged in single candidate groups, and means individual with each group and lying parallel thereto and moving parallel to said group for operating the voting devices to register votes, said means being provided with cams of different depth, certain of said cams operating to move the regular voting mechanisms a certain distance, and another cam operating to move the free ballot mechanism a different distance.

59. The combination in a voting machine of regular and irregular voting mechanisms movable by the voter into and out of voted position, and means operated by the voter after voting to move the irregular voting mechanisms indicated a greater distance than the regular voting mechanisms indicated.

60. The combination in a voting machine of regular and irregular voting mechanisms, arranged in single candidate groups, and a cam bar individual to each group, said cam bar having inclined cams cut therein for moving the voting mechanisms to their voted position and resetting them.

61. The combination in a voting machine of regular and irregular voting mechanisms, arranged in single candidate groups, a cam bar individual to each group for operating the voting mechanisms indicated therein, and means operated by the voter after voting for moving said cam bar first in one direction to move said voting mechanisms to voted position, and, second, in the opposite direction to reset and lock said voting mechanisms.

62. The combination in a voting machine of regular and irregular voting mechanisms arranged in groups, a cam bar for controlling the operation of the voting mechanism in each group thereof, and means for operating said cam bar to register votes.

63. The combination in a voting machine of regular and irregular voting mechanisms arranged in groups, and a cam bar operating in connection with each of said groups to register votes, said cam bar operating to move one class of said voting mechanisms a certain predetermined distance, and move the other class of said voting mechanisms a greater predetermined distance.

64. The combination in a voting machine of voting mechanisms, arranged in single candidate groups, a cam bar individual to the voting mechanisms of said group, said voting mechanisms being movable freely into and out of engagement with said cam bar, said cam bar preventing the registration of a vote, but permitting the indication thereof, and means for moving the said cam bar to secure the registration of a vote.

65. The combination in a voting machine of counters, a cam bar, and voting mechanisms including parts adapted to be operated by a voter, movable freely into and out of engagement with the cam bar, said cam bar preventing the operation of said counters, but permitting the indication of a vote, and said cam bar being movable to operate said voting mechanisms to secure the registration of a vote.

66. The combination in a voting machine of a series of voting keys, and means provided with a series of cams one for each key, said keys being movable freely into and out of engagement with said means, said means preventing the operation of the counters by the voter, but permitting the indication of the vote, and said means being moved, subsequently to the indication of a vote, to secure its registration.

67. The combination in a voting machine of a series of counter-actuators, a counter for each actuator and operated thereby and a reciprocating device movable substantially in the plane of said series of counter actuators and movable longitudinally to actuate the counters indicated, one member at a time, through their counter-actuator.

68. The combination in a voting machine of a series of voting mechanisms, arranged in single candidate groups, and reciprocating means individual to each group and movable substantially in the plane thereof, said means being moved longitudinally to secure the registration of votes, one at a time, in a guide for carrying said means.

69. The combination in a voting machine of voting mechanisms, arranged in single candidate groups, and reciprocating means individual to each group to register the votes indicated, said means being moved longitudinally to secure the registration of the votes, a guide for carrying said means, pins on said guide and slots in said means, said pins engaging with said slots.

70. The combination in a voting machine of slotted guides, voting mechanisms, each including a key and counter, said keys being each guided at one end by the shaft of the corresponding counter, and at the other end by one of said guides.

71. The combination in a voting machine of slotted guides, an apertured face plate and a series of keys and counters, arranged in single candidate groups, said keys being each carried at one end by the shaft of the corresponding counter, and at the other end by one of said guides.

72. The combination in a voting machine of keys and counters, arranged in single candidate groups, the universal operating bar individual to each group, and a guide for said universal bar, said guide also serving to guide the ends of the voting keys of its group.

73. The combination in a voting machine of voting keys and counters therefor, and means for guiding the keys at each end, the guiding means at one end and an actuator for the keys also serving to guide the actuator for the keys.

74. The combination in a voting machine of a key, of a counter, a pin carried on said key which limits the movement of the key by the voter, and means for subsequently engaging said pin to move said key to operate the counter.

75. The combination in a voting machine of a counter and actuating device therefor, a pin carried on said actuating device which limits its movement by a voter, and means for engaging said pin to reciprocate said actuating device to operate the counter.

76. The combination in a voting machine of a voting key, pallets carried on said key which engage with the star wheel to operate it, a pin carried on said voting key, and means engaging with said pin to prevent the operation of the counter by the voter, said means being operated to move the pallets to move the star wheel and operate the counter.

77. The combination in a voting machine of voting keys and counters and interlocking mechanism forming a single candidate group, and a shutter normally concealing the counters of said group, said shutter having flanges bent thereon which embrace the counting wheels of each counter and hold them in gear with each other.

78. The combination in a voting machine of voting keys and counters and interlocking mechanism forming a single candidate group, a shutter normally concealing the indication of said counter, and means on said shutter for holding the wheels of the counter in engagement with each other.

79. The combination in a voting machine of a series of counters, a shutter normally concealing said counters, and means on the shutter for holding the wheels of said counters in locked engagement with each other.

80. The combination in a voting machine of a series of counters, a shutter normally concealing said counters, and means on said shutter for preventing the wheels on said counter from spreading.

81. The combination in a voting machine of a series of voting mechanisms arranged in single candidate groups, the series of said single candidate groups combined in a section for assembling on the machine, a voting key for each of said voting mechanisms, a ballot board for covering the voting mechanisms of a section, having perforations therein through which extend said keys, a flange division piece on each side of said ballot board overlapping said keyboard and holding it in position on the machine, and means for holding said flange division piece.

82. The combination in a voting machine of keys, of a keyboard made up of a series of removable sections, openings therein for the voting keys, screw-threaded collars in said openings, with caps screwed thereon to lock said voting key out of individual operation.

83. The combination in a voting machine of a keyboard made of removable sections a T-iron for locking adjacent sections in place, said iron being hooked over the bottom plate of the machine and fastened at the top by sliding pins.

84. In a voting machine, a free ballot depositing mechanism, the interlocking part of said free ballot mechanism being provided with a recess, permitting two or more free ballot mechanisms to be coupled together.

85. The combination in a voting machine of a free ballot depositing mechanism, an interlocking channel therefor, the interlocking part of said free ballot mechanism normally extending beyond the interlocking channel, said extension being provided with a recess, and means for coupling a plurality of said mechanisms together through these recesses.

86. The combination in a voting machine of a free ballot depositing mechanism, a movable free ballot receptacle forming a permanent part thereof, means preventing the delivery of the free ballot from said receptacle when in its voted position, and means operated by the voter after voting to permit the deposit of the free ballot from said receptacle.

87. In a voting machine, the combination of single candidate voting mechanisms including wedges adapted to be operated by the voter, interlocking mechanisms therefor including interlocking blocks engaging with said wedges and a straight irregular voting device adapted when moved to move said wedges and blocks into close contact with each other, thereby taking up all of the lost motion out of the interlocking mechanism of each single candidate group by the operation of the straight irregular voting device.

88. In a voting machine, the combination of single candidate voting mechanisms including actuating keys and wedges carried thereby, interlocking mechanism for said voting mechanism including interlocking blocks in constant engagement with said wedges and a straight irregular voting device adapted when moved to bring all of said wedges and blocks in close contact with each other and to bring the top wedges in contact with the upper part of the interlocking mechanism, whereby all the lost motion in each interlocking mechanism is taken up.

89. The combination in a voting machine of a series of interlocking channels, each channel having a predetermined amount of interlocking space therein, a series of blocks and wedges engaging each other in said channel and filling said space when one or more interlocking wedges is in voted position, said wedges being movable into and out of voted position, means for forcing all of the blocks and wedges toward one end of the channel and holding them there to prevent movement of the blocks and wedges.

90. In a voting machine, the combination of individual candidate voting mechanisms including operating wedges, interlocking systems therefor including blocks in constant contact with said wedges, a straight irregular voting device and a single bar having a parallel movement operated by said straight irregular voting device, said bar being adapted when moved to contact with one of the wedges in each interlocking system, and move said wedges and blocks into close contact with each other and to bring the top wedges in contact with the upper part of the interlocking mechanism, whereby all of the lost motion in said interlocking systems is taken up and whereby all of the individual voting mechanisms are locked.

91. The combination in a voting machine of series of voting mechanisms having an interlocking channel arranged in single candidate groups, an interlocking system for each group consisting of blocks and wedges, abutments at each end of said channels, and means for crowding said blocks against one of the abutments to lock the voting mechanisms against operation.

92. The combination in a voting machine of series of voting mechanisms, arranged in single candidate groups, an interlocking system for each group, consisting of channels containing blocks and wedges, fixed abutments at each end of said channels, and movable abutments at one end of said channels, respectively, for crowding the blocks against the fixed abutment at the other end to lock the voting mechanism against operation.

93. The combination in a voting machine of a series of interlocking channels. one for each single candidate group, and a bar placed at one end of said interlocking channels and swinging longitudinally to crowd the interlocking mechanisms of said channels against the fixed abutments at the other end of the channels to lock the voting mechanisms against operation.

94. In a voting machine, the combination of a series of individual voting mechanisms representing single candidate groups, each mechanism including a voting key and a wedge pivotally attached thereto, interlocking mechanism for each of said groups including blocks constantly in contact with said wedges, a straight irregular voting device, a single bar adapted when moved to contact with the lowermost wedges in each row and thereby to take up all of the lost motion in the interlocking system, and connections between said bar and said irregular voting device.

95. The combination in a voting machine of a plurality of individual voting mechanisms, and a straight irregular voting mechanism interlocked with all of said individual voting mechanisms by the following instrumentalities:—a push piece, containing a right angle slot; a bell crank lever, having a pin connection with said slot, and a longitudinal swinging bar connected to said bell crank lever and engaging the interlocking mechanisms of the groups.

96. The combination in a voting machine of a series of individual voting mechanisms constituting groups, a straight irregular voting device interlocked therewith through interlocking mechanism of the groups, and a bar swung longitudinally by the straight irregular device, said bar engaging, when operated, directly with the interlocking mechanism of each of the groups.

97. The combination in a voting machine of a straight irregular voting device, provided with a right angle slot, and a bell crank lever engaging with said slot by means of a pin, the first part of the movement of said straight irregular operating to swing the bell crank lever, after which it is held locked against movement during the further forward movement of the straight irregular voting device.

98. The combination in a voting machine of an irregular voting device, a bell crank lever, interlocking mechanism operated thereby, and means on said voting device to move said bell crank lever during the first part of its voting movement, and hold it locked against movement during the last part of its voting movement.

99. The combination in a voting machine of individual voting mechanisms, a straight irregular voting device interlocked with said individual voting mechanism, by means of a push and a bell crank lever operating to swing longitudinally, and a bar carried on links, the swinging of said bar serving to take the lost motion out of the interlocked systems of the groups.

100. The combination in a voting machine of the individual voting mechanisms, both regular and irregular, a straight irregular voting device interlocked therewith by means of the interlocking mechanisms of the irregular voting mechanisms, and a bar swung longitudinally by the straight irregular voting device.

101. The combination in a voting machine of a series of voting devices, forming single candidate groups, an irregular balloting device individual to each group, and a straight irregular voting device interlocked with the individual voting mechanisms, the movement of said straight irregular operating to swing a bar longitudinally against the interlocking wedges of the individual irregular balloting devices and crowd all the interlocking parts together against fixed abutments.

102. The combination in a voting machine of a series of individual voting mechanisms, arranged in single candidate groups, a free ballot depositing mechanism individual to each group, and a straight irregular voting device interlocked with all the individual voting devices by means operating through the end wedge to move all of the interlocking blocks and wedges together against a fixed abutment.

103. The combination in a voting machine of a straight irregular device, a bell crank lever pivoted transversely thereto and operated thereby, and a bar moved longitudinally to move all the interlocking blocks and wedges of the single candidate voting mechanism to locked position.

104. The combination in a voting machine of a series of free ballot depositing devices, a perforated base-plate to permit the depositing of said ballots, a pivoted trough partitioned off to catch said free ballots and means for locking said trough up during an election.

105. The combination in a voting machine of a series of free ballot depositing devices, a base-plate perforated to permit the depositing of said ballots, a pivoted trough partitioned for each group, and chutes leading from the partition to the base-plate to the individual receptacles of the trough.

106. The combination in a voting machine of a series of free ballot depositing devices, a perforated base-plate permitting the depositing of said ballots, a closed receptacle below said base-plate partitioned off for the individual groups, and means for opening said inclosed receptacle to count the vote.

107. The combination in a voting machine of a series of free ballot depositing devices, a perforated base-plate therefor, separate receptacles for said ballots and a series of chutes to guide the free ballots into the proper receptacles, said receptacles being carried in a trough, and said trough being capable of being opened to count the vote.

108. The combination in a voting machine of a gate on the end of the machine, a crank operated by said gate outside of machine, a rod moved by said crank, a connecting rod within the machine, said connecting rod having a pin extending outside of the machine, and connected to the first named connecting rod, universal bars and oscillating plate cams pivoted to the main plate of the machine and connected to said connecting rod and oscillated thereby, said cams operating to reciprocate the universal bars on the machine.

109. The combination in a voting machine of keys, counters, a series of universal bars operating to move the counters and lock the keys, a frame carrying said universal bars, and a cam for reciprocating said frame.

110. The combination in a voting machine of a series of universal bars operating to limit the movement of the keys by the voter to move the counters and reset the keys, a frame carrying said universal bars, and a series of cams moved in unison to reciprocate said universal bars to move the counters and lock the keys.

111. The combination in a voting machine of a series of universal bars, a frame on which they are carried, pins on said frame, cam plates engaging said pins and oscillating parallel thereto, said cam plates being oscillated by means operated by the voter before and after voting.

112. The combination in a voting machine of counters, counter actuators, a series of universal bars adapted to move said counters, a frame on which they are carried, a spacing device for holding said bars against longitudinal movement, and means for reciprocating said bars and frame.

113. In a voting machine, the combination of voting keys, counters, universal bars for operating said keys and moving said counters, an angle iron, and a series of guides for said keys and bars connected to said angle iron.

114. The combination in a voting machine of the main plate of the machine, a series of cams pivoted thereto, universal bars moved by said cams, and guides for said universal bars, said guides being supported from the main plate of the machine.

115. The combination in a voting machine of counters and actuators therefor, of a series of universal bars for driving said actuators, a channel iron for carrying said universal bars, and means for reciprocating said channel iron to operate said universal bars to move the counters.

116. In a voting machine, the combination of counter actuators, counters, fixed shafts supporting said counters, and means for causing the counter actuators and counters to move relatively to each other to operate the counters, said means including a reciprocating frame, and oscillating cams to move said frame.

117. In a voting machine, the combination of counter actuators, counters mounted on fixed shafts, means for causing said counter actuators to operate said counters, consisting of a reciprocating frame, oscillating cams to move said frame, and means operated by the voter to actuate said cams.

118. The combination in a voting machine of a series of oscillating cams, a channel iron carried by said cams, a plurality of universal cam bars carried by said channel iron, and a slotted bar for holding said universal bars against longitudinal movement on the channel iron.

119. The combination in a voting machine of moving cams, a bar carried by said cams, universal bars attached thereto, a slotted spacing bar for holding the universal bars against longitudinal movement on the bar which carries them, and means for moving said cams.

120. In a voting machine, the combination of voting keys, a resetting bar therefor, a supporting angle iron, a second angle iron secured thereto, provided with slots for the guidance of the voting keys, and pin and slot connections between said second angle iron and said resetting bar.

121. The combination in a voting machine of a plurality of interlocking channels, a channel iron connecting said channels at one end, a channel made up of angle irons, connecting said channel at the other end, and means carried in this channel for grouping interlocking systems of the individual channels.

122. The combination in a voting machine of a series of interlocking channels, interlocking blocks and wedges, a spear head pivoted to the end block of each channel, a grouping channel located transversely to the interlocking channels, and interchangeable means carried by said grouping channel for grouping the spear heads of interlocking systems of the other channels.

123. The combination in a voting machine of a rock shaft for moving all of the keys of a party row simultaneously, and means for operating said rock shaft by means of a straight ticket lever on the keyboard of the machine moving across the face thereof.

124. The combination in a voting machine of a straight ticket lever moving across the face of the machine, a shaft carrying said lever, a slotted arm rigid with said shaft, and a rock shaft, having pins engaging with the said slot in said arm, whereby the movement of the straight ticket lever across the face of the machine will cause said shaft to rock and vote a straight ticket.

125. The combination in a voting machine of a rock shaft pivoted to the main plate, lugs on the keys, and a party row engaging with said rock shaft, and means for rocking said rock shaft, said means including a key movable across the face of the machine, the movement of which key will move the keys in its party row to voted position.

126. The combination in a voting machine of interlocking wedges and blocks of a woman's lockout device, and adjustable wedges carried by said woman's lockout device engaging with said interlocking wedges and blocks, the forward movement of said lockout device operating to raise the interlocking wedges and blocks in all the desired channels to lock the voting keys against operation through their interlocking system.

127. The combination in a voting machine of a series of interlocking channels, interlocking blocks and wedges carried in said channels, and means individual to each channel for simultaneously raising all of the interlocking blocks and wedges to lock the voting mechanisms against operation.

128. The combination in a voting machine of a series of interlocking channels, interlocking blocks and wedges carried by said channels, a sliding frame common to all of said channels, and removable wedges carried by said sliding frame and individual to each channel, whereby the sliding of said frame will cause each wedge to lift the interlocking blocks and wedges and lock the voting mechanism against voting operation.

129. The combination in a voting machine of voting mechanism, interlocking systems, a sliding frame, a series of wedges carried by said frame, and means to slide said frame, whereby the wedges lock the voting mechanisms out of operation through their interlocking systems.

130. The combination in a voting machine of an interlocking device comprising interlocking blocks and wedges, the woman's lockout device consisting of a movable frame carrying a series of movable wedges, said wedges engaging with the interlocking blocks and wedges of the interlocking device, to move them to locked position, whereby any part of said interlocking mechanism may be locked against operation, and means for operating said frame, said wedges being removable from said frame.

131. The combination in a voting machine of interlocking mechanism comprising interlocking blocks and wedges arranged in a single candidate group, of voting mechanisms, a woman's lockout device, consisting of a channel carrying a series of removable wedges, one for each single candidate group, and means for moving said channel to cause the wedges to lift the interlocking wedges and blocks of said channel against a fixed abutment, whereby the voting mechanisms controlled by said channels are locked against voting operation.

132. The combination in a voting machine of grouped voting mechanism, interlocking devices, a woman's lockout device, comprising a sliding frame common to all the office groups, wedges carried by said frame individual to the interlocking channels for locking said channels, an auxiliary sliding frame, stops on said frame for locking the yes and no groups, and means for operating both of said frames by a single handle from the back of the machine.

133. The combination in a voting machine of grouped voting mechanisms, a device for locking out a predetermined number of groups of voting mechanisms simultaneously, a device for locking out a predetermined number of yes and no groups simultaneously, a common rock shaft, and means connecting both of said locking devices to said rock shaft to move them simultaneously and lock out the predetermined voting devices.

134. The combination in a voting machine of limiting mechanism, an interchangeable grouping channel, interlocking blocks and wedges in said channel, and adjustable means carried by said channel for adjusting the limiting mechanism to vary or limit the number of votes which may be cast.

135. The combination in a voting machine of grouped voting mechanisms, a grouping channel, carrying interlocking blocks and wedges, one of said blocks being made in sections, each section being provided with a ratchet face, and means for clamping said ratchet face in any adjusted position.

136. The combination in a voting machine of grouped voting mechanisms, a series of interlocking channels individual to each group, an auxiliary channel for grouping a series of said single candidate groups, and adjustable means in said auxiliary channel to limit the number of votes cast to a predetermined number.

137. The combination in a voting machine of grouped voting mechanisms, a series of interlocking channels individual to each group, an auxiliary channel for grouping a series of said single candidate groups, and adjustable means in said auxiliary channel to limit the number of votes cast to a predetermined number, said adjustable means consisting of a divided block.

138. The combination in a voting machine of a series of interlocking channels individual to each group, an auxiliary channel for grouping a series of said single candidate groups, and a divided block in said auxiliary channel to limit the number of votes cast to a predetermined number.

139. The combination in an interchangeable interlocking system for a voting machine of a plurality of parallel interlocking channels, interlocking devices in the said channels, voting devices controlled by said interlocking devices, means for connecting two or more of said channels for group voting, said means including a movable abutment, said means controlling a number of votes that can be cast in the voting devices controlled by said interlocking devices, said adjustment being adjustable to vary or limit the number of votes cast by the voting devices controlled by said interlocking devices.

140. The combination in a voting machine of a series of interlocking channels, each carrying the interlocking mechanisms of a single candidate group, and a movable abutment for interchangeably grouping consecutive channels, said abutments being made adjustable in length to limit the number of votes cast in said groups to a predetermined number.

141. The combination in a voting machine of the keys and counters, arranged in parallel groups, a channel for each single candidate group, arranged parallel with the keys and counters thereof, interlocking wedges connected to said keys, interlocking blocks carried by said channel interlocking said keys, an auxiliary channel clamped to said interlocking channel, carrying a series of interlocking blocks, auxiliary wedges pivoted to the main wedges and engaging with the blocks of said auxiliary channel and an adjustable abutment at the end of said channel which limits the number of keys that can be voted in said channel.

142. The combination in a voting machine of a series of keys and counters, constituting a single candidate group, an interlocking channel therefor carrying blocks parallel with and individual to said group, wedges carried by the keys interlocking with said blocks, an auxiliary channel clamped to said interlocking channel carrying blocks, a variable number of auxiliary wedges detachably connected to the main wedges, and adjustable means for preventing the operation of more than one of said auxiliary wedges.

143. The combination in a voting machine of keys and counters arranged in single candidate groups, interlocking wedges connected to each key and interlocking with blocks carried in an interlocking channel individual to each group, means for combining a plurality of the parallel interlocking channels and their voting mechanisms in a multi-candidate group, and auxiliary channels detachably connected to the main channels, provided with means to prevent the operation of more than one of any number of keys in any one channel.

144. The combination in a voting machine of voting mechanisms arranged in single candidate groups, interlocking mechanisms therefor, detachable interlocking mechanism interlocking a particular set of keys in one group, and abutments each having an adjustable member thereon preventing the operation of more than one of the interlocked keys.

145. The combination in a voting machine of a main interlocking channel for a row or series of voting mechanisms, an auxiliary interlocking channel for each row or group, containing an interlocking block for each key in the group, removable means for interlocking any set of keys in the removable channel, and adjustable means in said channel preventing the operation of more than one of said set of keys.

146. The combination in a voting machine of voting mechanisms, consisting of keys and counters, an interlocking wedge pivotally connected to each voting key, said interlocking wedge being provided with an opening, and an auxiliary interlocking wedge provided with a pin for detachably connecting to said main interlocking wedge from the said opening.

147. The combination in a voting machine of voting mechanisms, comprising keys and counters, an interlocking wedge pivoted to each key, an auxiliary interlocking wedge detachably connected to some of the main interlocking wedges, limiting means for each set of wedges, and a device for preventing the operation of more than a predetermined number of the auxiliary interlocking wedges.

148. In a voting machine, the combination of a casing and a resetting mechanism mounted therein, an arm supported on the machine casing for operating the resetting mechanism, provided with perforated lugs, a gate provided with perforated hollow sleeves and pins for securing said gate to said arm.

149. In a voting machine, voting mechanism comprising a plurality of moving parts, means for locking said parts against movement, said means consisting of an arm carried on the end of the machine, said arm being provided with a lug, parallel plates on the end of the machine, a pin passing through said plates and engaging said lug and means for securing said pin.

150. The combination in a voting machine of keys and counters arranged in single candidate groups, a universal bar for each group for moving the keys to operate the counters individual to each group, and means for registering each movement of the universal bar.

151. The combination in a voting machine of a series of keys and counters arranged in single candidate groups, a universal bar for moving the keys to operate the counters, and means carried by said bar to operate a counter for every reciprocation of the bar.

152. In a voting machine, the combination of a series of keys and counters arranged in a group, a bar for operating the counters corresponding to the keys selected by a voter and connections operated by said bar for reciprocating a counter actuator with every reciprocation of the bar, whether any of the keys in such row have been operated by a voter or not.

153. The combination in a voting machine of a grouping channel, movable abutments in said channel, pins for holding said movable abutments stationary, said pins being formed as a staple, with one arm curved to act as a spring to hold it in place.

154. The combination in a voting machine of a series of voting devices having projections thereon, a bar having recesses therein, each of said voting devices being movable to engage its projection with its corresponding recess in said bar, said bar with its recess limiting the further forward movement of said voting device, and means operated by the exit of the voter to cause the longitudinal movement of said bar to operate the voting devices having projections in engagement therewith.

155. The combination in a voting machine of a series of voting devices having projections thereon, freely movable into and out of voted position without operating registers, a bar having recesses therein, each of said voting devices being movable to engage its projection with the corresponding recess in said bar, said bar with its recess limiting the further forward movement of said voting device, and means operated by the exit of the voter to cause the longitudinal movement of said bar to operate the voting device having projections in engagement therewith.

156. The combination in a voting machine, of a series of voting devices having projections thereon, a bar having recesses therein, each of said voting devices being movable to engage its projection with the corresponding recess in said bar, said bar with its recess limiting the further forward movement of said voting device, and means operated by the exit of the voter to cause the longitudinal movement of said bar to operate the voting devices and their corresponding registers having projections in engagement therewith, said registers being operated by said bar subsequent to the engagement of the projections on said voting devices with said bar.

157. A key controlling device for voting machines including a plurality of laterally movable wedge shaped plates, one for each office to be filled, and means for successively and progressively moving said plates longitudinally, consisting of a plurality of office groups of indicators, one group for each wedge shaped plate.

158. A key controlling device for voting machines including a plurality of laterally movable wedge shaped plates, one for each office to be filled, and a plurality of groups of indicators or keys, one group for each plate and operative to move said plate longitudinally, different distances proportional to the number of indicators or keys operated.

159. A key controlling device for voting machines including a plurality of laterally movable wedge shaped plates, one for each office to be filled, and means for successively and progressively moving said plates longitudinally, consisting of a plurality of office groups of indicators, one group for each wedge shaped plate, and interlocking devices to limit the number of wedge shaped plates that may be progressively and longitudinally moved.

160. A key controlling device for voting machines including a plurality of laterally movable wedge shaped plates, one for each office to be filled, and a plurality of groups of indicators or keys, one group for each plate and operative to move said plate longitudinally, different distances proportional to the number of indicators or keys operated, and interlocking devices to limit the number of wedge shaped plates that may be progressively and longitudinally moved.

161. In a machine of the character described, a series of voting devices each having a longitudinally movable shaft provided with a projecting pin, registers corresponding to said voting devices, means for connection between said voting devices and said registers to set ready to be registered those devices whose shafts are actuated, registering slides having beveled lugs adapted to engage said pins and return the voting shafts to their normal positions as the registers are actuated, a barrier and means of connection between said barrier and registering slides whereby the latter are retained in position with their lugs engaging said pins thereby locking said voting devices from being operated whenever said barrier is opened.

162. In a voting machine, the combination with series of movable parts, and tally-mechanisms for respective actuation thereby, of series of longitudinally and relatively movable locking-members terminally separable by cams actuated by said movable parts, a spacer, connected for longitudinal movement with each series of locking-members, said spacers carrying cams capable of movement transverse to the paths of the locking-members, and locking blocks mounted for movement in a direction transverse to said locking-members and interposed respectively between adjacent spacers for movement by the cams thereof, substantially as described.

163. In a voting machine, the combination with series of movable parts, and tally-mechanism for respective actuation thereby, of series of longitudinally and relatively movable locking members terminally separable by cams actuated by said movable parts, a spacer connected for longitudinal movement with each series of locking-members, carrying cams, and capable of movement transverse to the path of the locking members, locking-blocks mounted for movement in a direction transverse to the locking bolts and interposed respectively between adjacent spacers for actuation by the cams thereof, and filling-blocks adjustably mounted upon the spacers for interposition between the same and the adjacent extremities of the locking-blocks, substantially as specified.

164. In a voting machine, the combination of voting mechanisms including keys having wedges, a series of interlocking movable devices parallel with each single candidate group of keys and having terminal members provided with movable attachments carrying cam enlargements, said movable devices being transverse to the operable planes of the individual keys, and interchangeable grouping means disposed at right angles to the said interlocking movable devices and between which the cam enlargements of the attachments of the latter have movement for combining the single candidate groups into multi-candidate groups.

165. In a voting machine, the combination of voting mechanisms including keys having wedges, interlocking mechanisms carried by channels or guides, which are individual to and parallel with single candidate groups and comprising locking blocks or bolts, which interlock with the wedges of the keys, independent means for interlocking the blocks or bolts and disposed in a channel or guide to permit interchangeable group voting and including separable devices, and terminal attachments for said interlocking mechanisms carrying cam enlargements movable between said separable devices of the independent locking means.

166. In a voting machine, the combination of voting mechanism, a series of interlocking devices for said mechanisms, a grouping channel to which the individual interlocking devices are connected at one end, means in said grouping channel for interchangeably adjusting the grouping system and terminal attachments for each series of interlocking devices for the voting mechanisms carrying cam enlargements and forming the means of connecting the parts of the grouping channels with the said interlocking devices.

167. In a voting machine, the combination of voting mechanism including a series of voting keys, a series of interlocking devices, a grouping channel arranged at an angle to the said interlocking devices and in operable relation thereto, separable means carried by said grouping channel for interchangeably grouping the individual interlocking devices and a terminal cam device connected to each series of the interlocking devices and movable between the separable means in the grouping channel.

168. In a voting machine, the combination of voting mechanisms, arranged in single candidate groups and having interlocking devices for each group, voting mechanism including keys having wedges and the interlocking devices comprising channels or guides with blocks movably mounted therein having cam wedges at the front portion of the free end of each, a grouping channel with interlocking blocks with which the said blocks of the interlocking mechanism are in operable relation, means for interchangeably grouping the blocks of the grouping channel and the said single candidate groups, and a terminal spreading device connected to each series of interlocking devices and movable between the blocks in the grouping channel.

169. In a voting machine, the combination of voting mechanism having movable elements arranged in groups representing different party candidates for the same office, an independent series of shiftable devices disposed in operable relation to each group of movable elements, loosely mounted grouping members coöperating with the said shiftable devices for interchangeably grouping the latter, and a separating device having an enlargement and terminally attached to each series of shiftable devices related to each group of movable elements, the several separating devices being movable between the said grouping devices.

170. In a voting machine, independent series of registering keys, corresponding series of shiftable devices disposed in operable relation to the said series of keys, grouping members coöperating with the said shiftable devices for interchangeably grouping the latter, and spacers for adjustment in fixed position between the grouping devices.

171. In a voting machine, a plurality of keys movable at right angles to the keyboard arranged in parallel office lines; wedges of equal length connected thereto; devices for interlocking with said wedges and means for holding said devices in rows parallel to the rows of keys interlocked, said parallel rows of interlocking devices being interchangeably related, permitting the combination of two or more office lines into one multicandidate group, or permitting the division of a multicandidate group into its respective office lines, said interlocking devices in each row having a progressive movement in obedience to successive keys voted in said row and means for communicating the interlocking effect in one row of interlocking devices to the adjacent rows of interlocking devices in the same multicandidate group to limit the total number of keys that can be voted in the group.

172. In a voting machine, a plurality of keys freely movable into and out of voted position at right angles to the keyboard arranged in parallel office lines, wedges of equal length connected thereto, devices for interlocking with said wedges and means for holding said devices in rows parallel to the rows of keys interlocked, said parallel rows of interlocking devices being interchangeably related, permitting the combination of two or more office lines into one multicandidate group, or permitting the division of a multicandidate group into its respective office lines, said interlocking devices in each row having a progressive movement in obedience to successive keys voted in said row and means for communicating the interlocking effect in one row of interlocking devices to the adjacent row of interlocking devices in the same multicandidate group to limit the total number of keys that can be voted in the group.

173. In a voting machine, a plurality of keys arranged in parallel office lines, wedges connected thereto, blocks for interlocking with said wedges and means for holding said blocks in rows parallel to the rows of keys interlocked, said parallel rows of interlocking blocks being interchangeably related, permitting the combination of two or more office lines into one multicandidate group, or permitting the division of a multicandidate group into its respective office lines, said interlocking blocks in each row having a progressive movement in obedience to successive keys voted in said row and means for communicating the interlocking effect in one row of interlocking blocks to the adjacent rows of interlocking blocks in the same multicandidate group to limit the total number of keys that can be voted in the group.

174. In a voting machine, the combination of a plurality of keys freely movable into and out of voted position and arranged in parallel office lines, wedges connected thereto, blocks for interlocking with said wedges and means for holding said blocks in rows parallel to the rows of keys interlocked, said parallel rows of interlocking blocks being interchangeably related, permitting the combination of two or more office lines into one multicandidate group, or permitting the division of a multicandidate group into its respective office lines, said interlocking blocks in each row having a progressive movement in obedience to successive keys voted in said row and means for communicating the interlocking effect in one row of interlocking blocks to the adjacent rows of interlocking blocks in the same multicandidate group to limit the total number of keys that can be voted in the group.

175. In a voting machine, a plurality of keys arranged in parallel office lines, wedges connected thereto, devices for interlocking with said wedges and means for holding said devices in rows parallel to the rows of keys interlocked, said parallel rows of interlocking devices being interchangeably related, permitting the combination of two or more office lines into one multicandidate group, or permitting the division of a multicandidate group into its respective office lines, said interlocking devices in one row having a progressive movement in obedience to successive keys voted in said row and means for causing said progressive movement of the interlocking devices in one row to lock the keys of other rows in the same group against movement, and thus limit the total number of keys that can be voted in the group.

176. In a voting machine, the combination of a plurality of keys freely movable into and out of voted position and arranged in parallel office lines, wedges connected thereto, devices for interlocking with said wedges and means for holding said devices in rows parallel to the rows of keys interlocked, said parallel rows of interlocking devices being interchangeably related, permitting the combination of two or more office lines into one multicandidate group, or permitting the division of a multicandidate group into its respective office lines, said interlocking devices in one row having a progressive movement in obedience to successive keys voted in said row and means for causing said progressive movement of the interlocking devices in one row to lock the keys of other rows in the same group against movement, and thus limit the total number of keys that can be voted in the group.

177. In a voting machine, a plurality of keys arranged in parallel office lines, and movable freely to and from voted position, wedges connected thereto, devices for interlocking with said wedges arranged in parallel rows, said parallel rows of interlocking devices being interchangeably related, permitting the combination of two or more office lines into one multicandidate group, or permitting the division of a multicandidate group into its respective office lines, said interlocking devices in one row having a progressive movement in obedience to successive keys voted in said row and means for communicating the interlocking effect in one row of interlocking devices to the adjacent rows of interlocking devices in the same multicandidate group to limit the total number of keys that can be voted in the group.

178. In a voting machine, a plurality of keys arranged in parallel office lines, wedges connected thereto, devices for interlocking with said wedges and means for holding said devices in parallel rows to the rows of keys interlocked, said parallel rows of interlocking devices being interchangeably related, permitting the combination of two or more office lines into one multicandidate group, or permitting the division of a multicandidate group into its respective office lines, said interlocking devices in one row having a progressive movement in obedience to successive keys voted in said row and means for communicating the interlocking effect in one row of interlocking devices to the adjacent rows of interlocking devices in the same multicandidate group to limit the total number of keys that can be voted in the group.

179. In a voting machine, the combination of a plurality of keys freely movable into and out of voted position and arranged in parallel office lines, wedges connected thereto, devices for interlocking with said wedges and means for holding said devices in parallel rows to the rows of keys interlocked, said parallel rows of interlocking devices being interchangeably related, permitting the combination of two or more office lines into one multicandidate group, or permitting the division of a multicandidate group, into its respective office lines, said interlocking devices in one row having a progressive movement in obedience to successive keys voted in said row and means for communicating the interlocking effect in one row of interlocking devices to the adjacent rows of interlocking devices in the same multicandidate group to limit the total number of keys that can be voted in the group.

180. In a voting machine, the combination of a plurality of keys movable at right angles to the keyboard arranged in parallel office lines, interlocking devices for said keys, and means for holding said devices in rows parallel to the rows of keys interlocked, said parallel rows of interlocking devices being interchangeably related, permitting the combination of two or more office lines into one multicandidate group, or permitting the division of a multicandidate group into its component office lines, said interlocking devices in each row having a progressive movement in obedience to successive keys voted in said row, and means for communicating the interlocking effect in one row of interlocking devices to the adjacent rows of interlocking devices in the same multicandidate group to limit the total number of keys that can be voted in the group.

181. In a voting machine, the combination of a plurality of keys freely movable into and out of voted position at right angles to the keyboard arranged in parallel office lines, interlocking devices for said keys, and means for holding said devices in rows parallel to the rows of keys interlocked, said parallel rows of interlocking devices being interchangeably related, permitting the combination of two or more office lines into one multicandidate group, or permitting the division of a multicandidate group into its component office lines, said interlocking devices in each row having a progressive movement in obedience to successive keys voted in said row, and means for communicating the interlocking effect in one row of interlocking devices to the adjacent rows of interlocking devices in the same multicandidate group to limit the total number of keys that can be voted in the group.

182. In a voting machine, the combination of a plurality of voting devices arranged in parallel office lines, interlocking devices for said voting devices, means for holding said interlocking devices in rows parallel to the rows of voting devices interlocked, said parallel rows of interlocking devices being interchangeably related, permitting the combination of two or more office lines into one multicandidate group, or permitting the division of a multicandidate group into its component office lines, said interlocking devices in each row having a progressive movement in obedience to the movement of the voting devices operated in said row, and means for communicating the interlocking effect in one row of interlocking devices to the adjacent rows of interlocking devices in the same multicandidate group to limit the total number of keys that can be voted in the group.

183. In a voting machine, the combination of a plurality of voting devices freely movable into and out of voted position and arranged in parallel lines on the keyboard, interlocking devices for said voting devices, and means for holding said interlocking devices in rows parallel to the rows of voting devices interlocked, said parallel rows of interlocking devices being interchangeably related, permitting the combination of two or more office lines into one multicandidate group, or permitting the division of a multi-candidate group into its component office lines, said interlocking devices in each row having a progressive movement in obedience to the movement of the voting devices operated in said row, and means for communicating the interlocking effect in one row of interlocking devices to the adjacent rows of interlocking devices in the same multicandidate group to limit the total number of keys that can be voted in the group.

In testimony whereof, I affix my signature, in presence of two witnesses.

ANGUS McKENZIE.

Witnesses:
J. NIVEN HEGEMAN,
FRANK KEIPER.

Copies of this patent may be obtained for five cents each, by addressing the "Commissioner of Patents, Washington, D. C."